United States Patent
Mizuno et al.

(10) Patent No.: US 11,899,313 B2
(45) Date of Patent: Feb. 13, 2024

(54) DISPLAY APPARATUS

(71) Applicant: Japan Display Inc., Tokyo (JP)

(72) Inventors: Manabu Mizuno, Tokyo (JP); Kentaro Okuyama, Tokyo (JP); Hiroshi Inamura, Tokyo (JP); Hiroki Sugiyama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/097,631

(22) Filed: Jan. 17, 2023

(65) Prior Publication Data

US 2023/0152631 A1 May 18, 2023

Related U.S. Application Data

(63) Continuation of application No. 17/560,786, filed on Dec. 23, 2021, now Pat. No. 11,592,712, which is a
(Continued)

(30) Foreign Application Priority Data

Aug. 1, 2016 (JP) .................................. 2016-151455

(51) Int. Cl.
G02F 1/13357 (2006.01)
F21V 8/00 (2006.01)
(Continued)

(52) U.S. Cl.
CPC ..... *G02F 1/133615* (2013.01); *G02B 6/0055* (2013.01); *G02B 6/0076* (2013.01);
(Continued)

(58) Field of Classification Search
CPC ..... G02B 6/0055; G02F 1/137; G02F 1/1334; G02F 2001/13756; G02F 2201/123;
(Continued)

(56) References Cited

U.S. PATENT DOCUMENTS 6,108,060 A 8/2000 Funamoto et al.
6,151,087 A 11/2000 Prigent
(Continued)

FOREIGN PATENT DOCUMENTS

EP 0823587 2/1998
EP 0823587 A1 * 2/1998
(Continued)

OTHER PUBLICATIONS

Japanese Office Action issued in related Japanese Patent Application No. 2016-151455, dated Feb. 18, 2020, and English translation of same. 8 pages.
(Continued)

*Primary Examiner* — Shan Liu
(74) *Attorney, Agent, or Firm* — K&L Gates LLP

(57) ABSTRACT

According to an aspect, a display apparatus includes: a first light-transmissive substrate; a second light-transmissive substrate arranged to face the first light-transmissive substrate; a liquid crystal layer including polymer dispersed liquid crystals sealed between the first light-transmissive substrate and the second light-transmissive substrate; at least one light-emitting device arranged to face at least one of a side surface of the first light-transmissive substrate or a side surface of the second light-transmissive substrate; and at least one reflector arranged on at least one of a side surface of the first light-transmissive substrate or a side surface of the second light-transmissive substrate, the side surface of the first or second light-transmissive substrate being on an opposite side of the side surface of the first or second light-transmissive substrate to which the at least one light-emitting device faces, and configured to reflect light at the side surface on the opposite side.

6 Claims, 19 Drawing Sheets

Related U.S. Application Data continuation of application No. 17/115,201, filed on Dec. 8, 2020, now Pat. No. 11,237,431, which is a continuation of application No. 16/743,530, filed on Jan. 15, 2020, now Pat. No. 10,890,804, which is a continuation of application No. 15/664,780, filed on Jul. 31, 2017, now Pat. No. 10,545,377.

(51) Int. Cl.
  *G02F 1/1334* (2006.01)
  *G02F 1/137* (2006.01)
  *G02F 1/1339* (2006.01)
  *G02F 1/1341* (2006.01)

(52) U.S. Cl.
  CPC ............ *G02F 1/137* (2013.01); *G02F 1/1334* (2013.01); *G02F 1/133605* (2013.01); *G02F 1/1339* (2013.01); *G02F 1/1341* (2013.01); *G02F 1/13756* (2021.01); *G02F 2201/121* (2013.01)

(58) Field of Classification Search
  CPC .................. G02F 1/1337; G02F 1/1341; G02F 2201/121; G02F 1/1339; G02F 2001/133742; G02F 1/1336; G02F 2001/133607; G02F 2001/133616; G02F 1/133606; G02F 1/133504; G02F 1/133615; G02F 6/0011; G02F 6/0013; G02F 6/0015; G02F 6/0016; G02F 6/0018; G02F 6/002; G02F 6/0021; G02F 6/0023; G02F 6/0025; G02F 6/0026; G02F 6/0028; G02F 6/003; G02F 6/0031; G02F 6/0088; G02F 1/133605; G02F 2001/133626
  USPC ................................................ 349/86, 61–67
  See application file for complete search history.

(56) References Cited

U.S. PATENT DOCUMENTS

| | | | |
|---|---|---|---|
| 6,229,585 B1 | 5/2001 | Yanagi | |
| 6,547,616 B1 | 4/2003 | Furukawa et al. | |
| 6,956,630 B2 | 10/2005 | Ariyoshi | |
| 10,890,804 B2 * | 1/2021 | Mizuno | G02B 6/0055 |
| 11,237,431 B2 * | 2/2022 | Mizuno | G02F 1/133605 |
| 11,592,712 B2 * | 2/2023 | Mizuno | G02F 1/133605 |
| 2002/0033909 A1 | 3/2002 | Hiyama et al. | |
| 2002/0180908 A1 | 12/2002 | Ariyoshi et al. | |
| 2003/0043315 A1 | 3/2003 | Umemoto | |
| 2004/0169800 A1 | 9/2004 | Yoshii et al. | |
| 2009/0135334 A1 | 5/2009 | Akiyama et al. | |
| 2011/0149201 A1 | 6/2011 | Powell | |
| 2012/0098875 A1 | 4/2012 | Shinkai et al. | |
| 2013/0135895 A1 | 5/2013 | Ohshima | |
| 2013/0328807 A1 | 12/2013 | Matsumoto | |
| 2014/0055835 A1 | 2/2014 | Shinkai et al. | |
| 2014/0146563 A1 | 5/2014 | Watanabe | |
| 2014/0240642 A1 | 8/2014 | Furukawa et al. | |
| 2015/0293402 A1 | 10/2015 | Shinkai et al. | |
| 2017/0160592 A1 | 6/2017 | Okuyama | |
| 2017/0269433 A1 | 9/2017 | Sugiyama et al. | |
| 2017/0285420 A1 | 10/2017 | Okuyama et al. | |
| 2017/0357115 A1 | 12/2017 | Jeon et al. | |
| 2018/0031758 A1 | 2/2018 | Mizuno et al. | |

FOREIGN PATENT DOCUMENTS

| | | | |
|---|---|---|---|
| JP | H1073819 A | * | 8/1996 |
| JP | H09-068700 | | 3/1997 |
| JP | H10-133591 | | 5/1998 |
| JP | 10-186361 | | 7/1998 |
| JP | 2002-049037 A | | 2/2002 |
| JP | 2004309774 | | 11/2004 |
| JP | 2007-200741 A | | 8/2007 |
| JP | 2010-230835 A | | 10/2010 |
| JP | 2013-114947 A | | 6/2013 |
| JP | 2018-021974 A | | 2/2018 |
| WO | WO2006104159 | | 10/2006 |

OTHER PUBLICATIONS

Japanese Office Action dated Oct. 6, 2020 in corresponding Japanese Application No. 2016-151455 and English translation of same. 8 pages.

Japanese Office Action issued in related Japanese Patent Application No. 2021-075420 dated Apr. 19, 2022 and English translation of same. 8 pages.

Japanese Office Action issued in related Japanese Patent Application No. 2021-075420 dated Oct. 4, 2022 and English translation of same. 6 pages.

Japanese Office Action issued in related Japanese Patent Application No. 2021-075420, dated Mar. 7, 2023, and English translation of same. 7 pages.

* cited by examiner

DISPLAY APPARATUS

CROSS-REFERENCES TO RELATED APPLICATIONS

The present application is a continuation of U.S. application Ser. No. 17/560,786, filed on Dec. 23, 2021, which is a continuation of U.S. application Ser. No. 17/115,201, filed on Dec. 8, 2020, now U.S. Pat. No. 11,237,431 issued on Feb. 1, 2022, which is a continuation of Ser. No. 16/743,530, filed on Jan. 15, 2020, now U.S. Pat. No. 10,890,804 issued on Jan. 12, 2021, which is a continuation of U.S. application Ser. No. 15/664,780, filed on Jul. 31, 2017, now U.S. Pat. No. 10,545,377, issued on Jan. 28, 2020, which claims priority from Japanese Application No. 2016-151455, filed on Aug. 1, 2016, the contents of each of which are incorporated by reference herein in its entirety.

BACKGROUND

1. Technical Field

The present disclosure relates to a display apparatus.

2. Description of the Related Art

Japanese Patent Application Laid-open Publication No. 2013-114947 (JP-A-2013-114947) and Japanese Patent Application Laid-open Publication No. 2007-200741 (JP-A-2007-200741) describe a surface light source device or a so-called backlight device arranged on the back of a display panel. Japanese Patent Application Laid-open Publication No. 2010-230835 (JP-A-2010-230835) describes a reflective liquid crystal display apparatus including a sidelight, a side reflection plate, and a reflection plate arranged on the back of a display panel.

In the display apparatuses of JP-A-2013-114947, JP-A-2010-230835, and JP-A-2007-200741, the backlight device arranged on the back of the display panel or the reflection plate blocks background light on a second surface side on the opposite side of a first surface of the display panel, which makes it hard for a background on the second surface side to be visually recognized from the first surface of the display panel.

For the foregoing reasons, there is a need for a display apparatus that allows visual recognition, from one surface of a display panel, of a background on the other surface side opposite to the one surface side, and suppresses an amount of light leaking from a second side surface of the display panel, the light having entered a first side surface of the display panel.

SUMMARY

According to an aspect, a display apparatus includes: a first light-transmissive substrate; a second light-transmissive substrate arranged to face the first light-transmissive substrate; a liquid crystal layer including polymer dispersed liquid crystals sealed between the first light-transmissive substrate and the second light-transmissive substrate; at least one light-emitting device arranged to face at least one of a side surface of the first light-transmissive substrate or a side surface of the second light-transmissive substrate; and at least one reflector arranged on at least one of a side surface of the first light-transmissive substrate or a side surface of the second light-transmissive substrate, the side surface of the first or second light-transmissive substrate being on an opposite side of the side surface of the first or second light-transmissive substrate to which the at least one light-emitting device faces, and configured to reflect light at the side surface on the opposite side.

DETAILED DESCRIPTION

Figure 1:
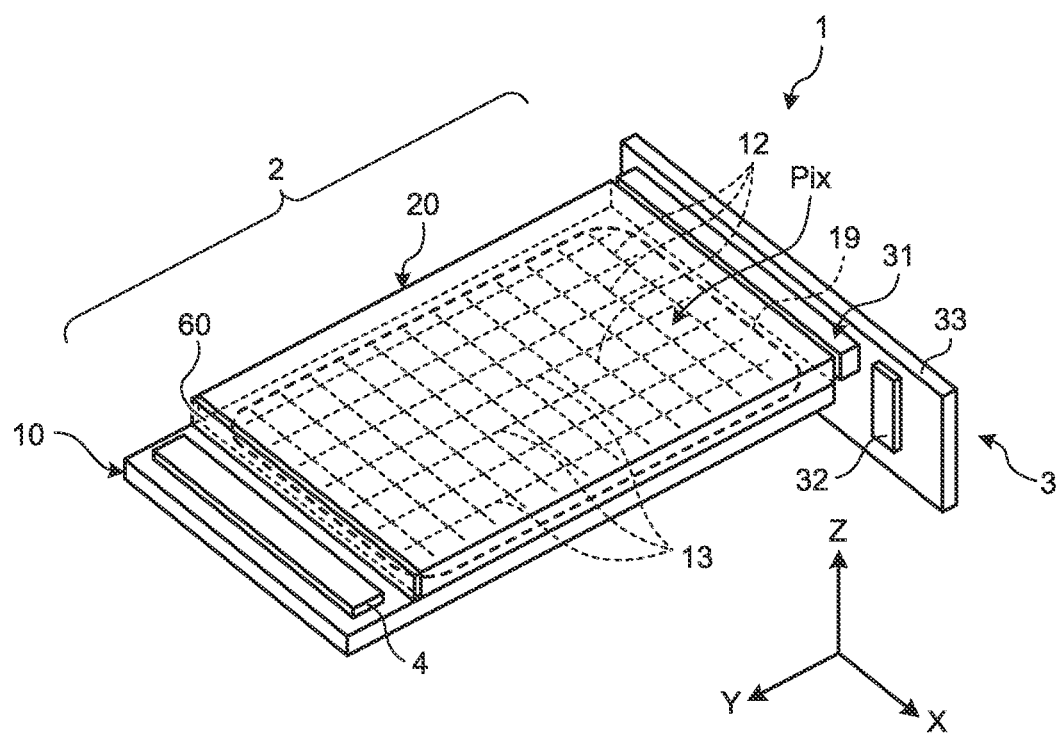
FIG. 1 is a perspective view illustrating an example of a display apparatus according to a first embodiment.

Modes (embodiments) for carrying out the present disclosure will be described in detail with reference to the drawings. The present disclosure is not limited by the descriptions of the following embodiments. The elements described hereunder include those that can be easily thought of by those skilled in the art and substantially the same elements. The elements described hereunder may also be combined as appropriate. The disclosure is merely an example, and the present disclosure naturally encompasses appropriate modifications maintaining the gist of the disclosure that is easily conceivable by those skilled in the art. To further clarify the description, a width, a thickness, a shape, and the like of each component may be schematically illustrated in the drawings as compared with an actual aspect. However, this is merely an example and interpretation of the disclosure is not limited thereto. The same elements as those described in the drawings that have already been discussed are denoted by the same reference numerals throughout the description and the drawings, and detailed description thereof will not be repeated in some cases. In this disclosure, when an element is described as being "on" another element, the element can be directly on the other element, or there can be one or more elements between the element and the other element.

First Embodiment

Figure 2:
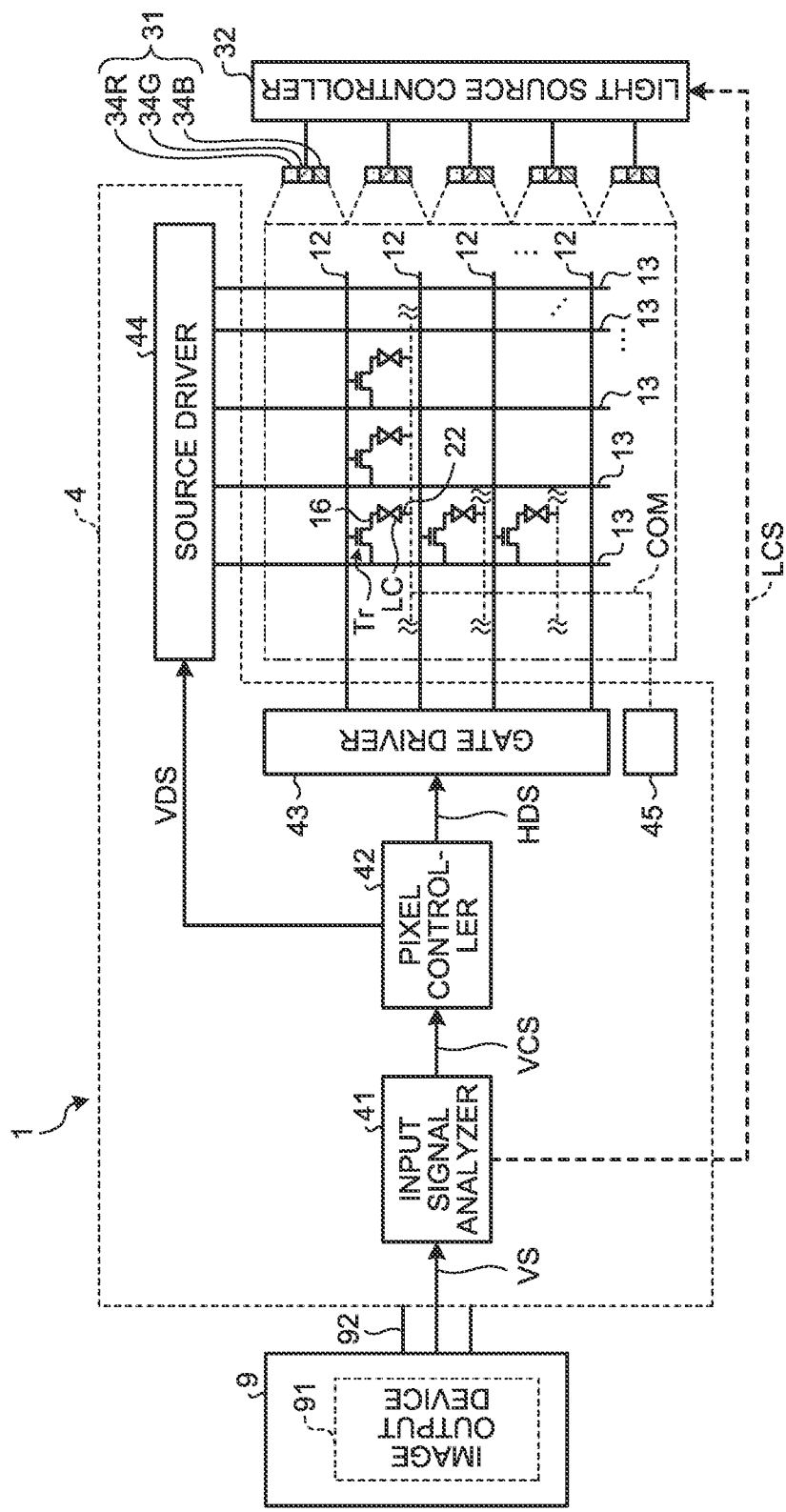
FIG. 2 is a block diagram illustrating the display apparatus of FIG. 1.
Figure 3:
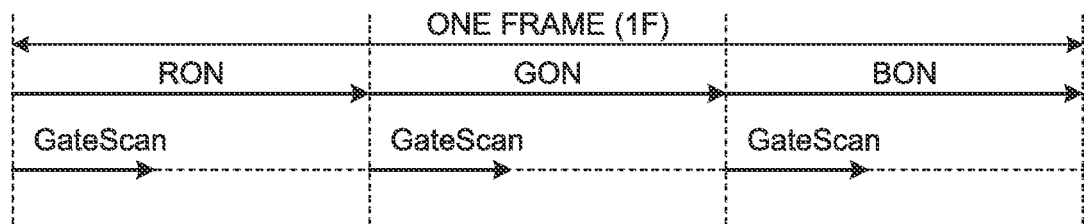
FIG. 3 is a timing chart for describing timing to emit light by a light source in a field sequential method.

FIG. 1 is a perspective view illustrating an example of a display apparatus according to a first embodiment. FIG. 2 is a block diagram illustrating the display apparatus of FIG. 1. FIG. 3 is a timing chart for describing timing to emit light by a light source in a field sequential method.

As illustrated in FIG. 1, a display apparatus 1 includes a display panel 2, a sidelight source device 3, and a drive circuit 4. In this description, a direction on a plane of the display panel 2 is referred to as an X direction, a direction perpendicular to the X direction is referred to as a Y direction, and a direction perpendicular to an X-Y plane is referred to as a Z direction.

Figure 5:
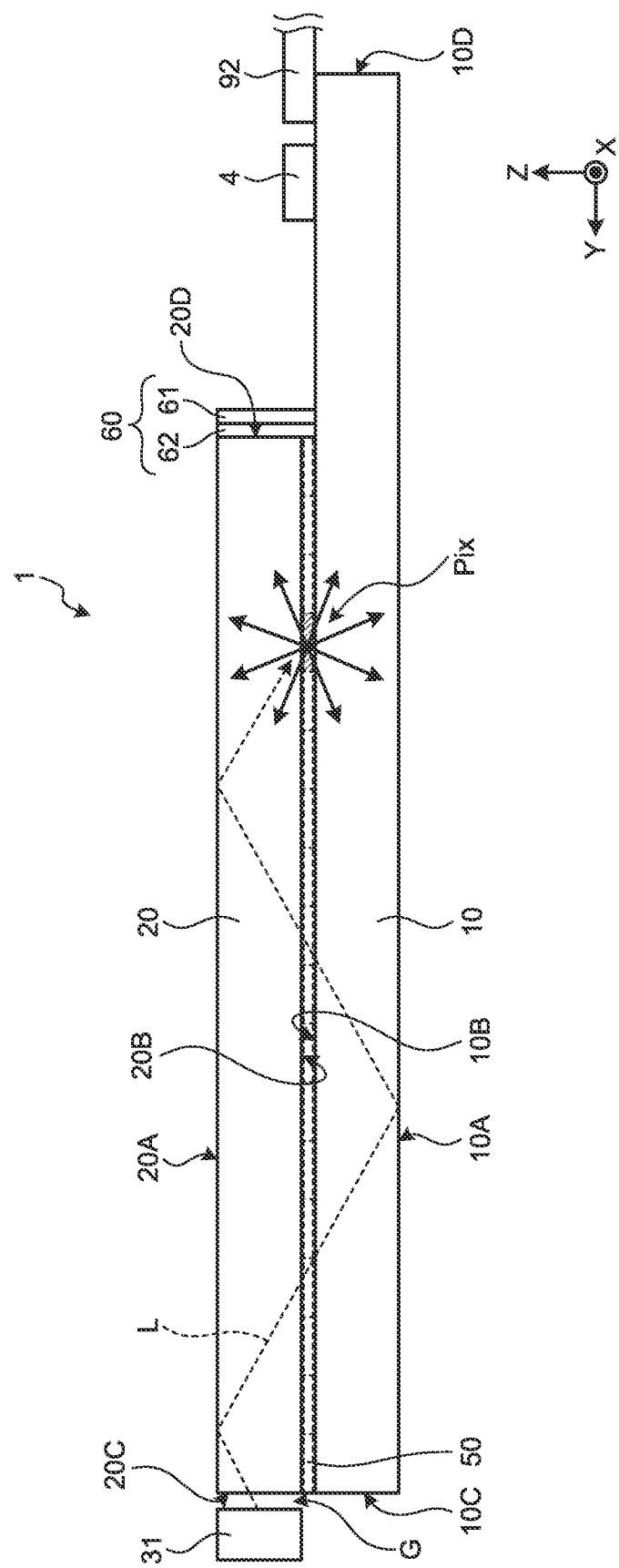
FIG. 5 is a cross-sectional view illustrating an example of a cross-section of the display apparatus of FIG. 1.

The display panel 2 includes a first light-transmissive substrate 10, a second light-transmissive substrate 20, and a liquid crystal layer 50 (see FIG. 5). The second light-transmissive substrate 20 is arranged to face the first light-transmissive substrate 10 in a direction perpendicular to a surface of the first light-transmissive substrate 10 (in the Z direction illustrated in FIG. 1). Polymer dispersed liquid crystals described below are sealed in the liquid crystal layer 50 (see FIG. 5) with the first light-transmissive substrate 10, the second light-transmissive substrate 20, and a sealant 19.

As illustrated in FIG. 1, the inside of the sealant 19 serves as a display area in the display panel 2. A plurality of pixels Pix is arranged in the display area in a matrix manner to have a row-column configuration. In the present disclosure, a row refers to a pixel row having m pixels Pix arranged in a direction, and a column refers to a pixel column having n pixels Pix arranged in a direction perpendicular to the direction in which the rows are arranged. The values of m and n are determined according to a display resolution in the vertical direction and a display resolution in the horizontal direction. A plurality of scanning lines 12 is routed in respective rows and a plurality of signal lines 13 is routed in respective columns.

The sidelight source device 3 includes a light-emitting device 31, a light source controller 32, and a light source substrate 33 on which the light-emitting device 31 and the light source controller 32 are arranged. The light source controller 32 is electrically coupled with the drive circuit 4 through wiring of a flexible substrate (not illustrated), for example. The light-emitting device 31 and the light source controller 32 are electrically coupled with each other through wiring in the light source substrate 33.

As illustrated in FIG. 1, the drive circuit 4 is fixed to a surface of the first light-transmissive substrate 10. As illustrated in FIG. 2, the drive circuit 4 includes an input signal analyzer 41, a pixel controller 42, a gate driver 43, a source driver 44, and a common potential driver 45. The first light-transmissive substrate 10 has a larger area on an XY plane than that of the second light-transmissive substrate 20, and the drive circuit 4 is provided on a portion of the first light-transmissive substrate 10 which is exposed from the second light-transmissive substrate 20.

An image input signal (e.g., RGB data) VS is input to the input signal analyzer 41 from an image output device 91 of an external host controller 9 through a flexible substrate 92.

The input signal analyzer 41 generates an image control signal VCS and a backlight control signal LCS on the basis of the image input signal VS input from the outside. The backlight control signal LCS is a signal including information on a light amount of the light-emitting device 31 set according to an average input gradation value to all the pixels Pix, for example. When a dark image is displayed, for example, the light amount of the light-emitting device 31 is set to be small. When a bright image is displayed, the light amount of the light-emitting device 31 is set to be large.

The image control signal VCS is a signal that determines a gradation value provided to each of the pixels Pix of the display panel 2. In other words, the image control signal VCS is a signal including gradation information regarding the gradation value of each of the pixels Pix. The pixel controller 42 performs correction processing such as gamma correction and extension processing on an input gradation value of the image control signal VCS to set the output gradation value. The pixel controller 42 then generates a horizontal drive signal HDS and a vertical drive signal VDS on the basis of the image control signal VCS. In the present embodiment, the light-emitting device 31 is driven by a field sequential method, and thus the horizontal drive signal HDS and the vertical drive signal VDS are generated for each color that can be emitted by the light-emitting device 31.

The gate driver 43 sequentially selects each scanning line 12 of the display panel 2 within one vertical scanning period in accordance with the horizontal drive signal HDS. The order of selecting each scanning line 12 is arbitrary.

The source driver 44 supplies a gradation signal according to an output gradation value of each pixel Pix to each signal line 13 of the display panel 2 within one horizontal scanning period in accordance with the vertical drive signal VDS.

In the first embodiment, the display panel 2 is an active matrix panel. Thus, the display panel 2 includes the signal (source) lines 13 extending in the X direction and the scanning (gate) lines 12 extending in the Y direction in plan view, and includes switching elements Tr at intersection portions of the respective signal lines 13 and the respective scanning lines 12.

A thin film transistor is used as the switching element Tr. Examples of the thin film transistor include, but are not limited to, a bottom gate transistor and a top gate transistor. In the description, a single gate thin film transistor is exemplified as the switching element Tr, but a double gate transistor may be used. One of a source electrode and a drain electrode of the switching element Tr is coupled with the signal line 13, a gate electrode is coupled with the scanning line 12, and the other of the source electrode and the drain electrode is coupled with one end of capacitance LC of liquid crystal. The capacitance LC of a liquid crystal has one end coupled with the switching element Tr through a pixel electrode 16, and the other end coupled with a common potential COM through a common electrode 22. The common potential COM is supplied from a common potential driver 45.

The light-emitting device 31 includes a luminous body 34R of a first color (e.g., red), a luminous body 34G of a second color (e.g., green), and a luminous body 34B of a third color (e.g., blue). The light source controller 32 controls the luminous body 34R of the first color, the luminous body 34G of the second color, and the luminous body 34B of the third color to emit light in a time division manner. The luminous body 34R of the first color, the luminous body 34G of the second color, and the luminous body 34B of the third color are driven by the so-called field sequential method.

As illustrated in FIG. 3, in a first sub-frame (first predetermined time) RON, the luminous body 34R of the first color emits light, and the pixels Pix selected within one vertical scanning period GateScan transmit and display the light. At this time, in the entire display panel 2, if the gradation signal according to the output gradation value of each of the pixels Pix selected within the one vertical scanning period GateScan is supplied to each of the above-described signal lines 13, only the first color is lighted.

Next, in a second sub-frame (second predetermined time) GON, the luminous body 34G of the second color emits light, and the pixels Pix selected within the one vertical scanning period GateScan transmit and display the light. At this time, in the entire display panel 2, if the gradation signal according to the output gradation value of each of the pixels Pix selected within the one vertical scanning period GateScan is supplied to each of the above-described signal lines 13, only the second color is lighted.

Further, in a third sub-frame (third predetermined time) BON, the luminous body 34B of the third color emits light, and the pixels Pix selected within the one vertical scanning period GateScan transmit and display the light. At this time, in the entire display panel 2, if the gradation signal according to the output gradation value of each of the pixels Pix selected within the one vertical scanning period GateScan is supplied to each of the above-described signal lines 13, only the third color is lighted.

The eyes of a human have a limited temporal resolution, and see an afterimage. Thus, the eyes of a human recognize a synthesized image of three colors in one-frame period. The field sequential method requires no color filter, and suppresses an absorption loss in color filters, which can realize high transmittance. In a color filter method, one pixel is made of sub-pixels obtained by dividing the pixel into the first color, the second color, and the third color. On the other hand, the field sequential method does not require such division into sub-pixels, and thus can facilitate increase of the resolution.

Figure 4:
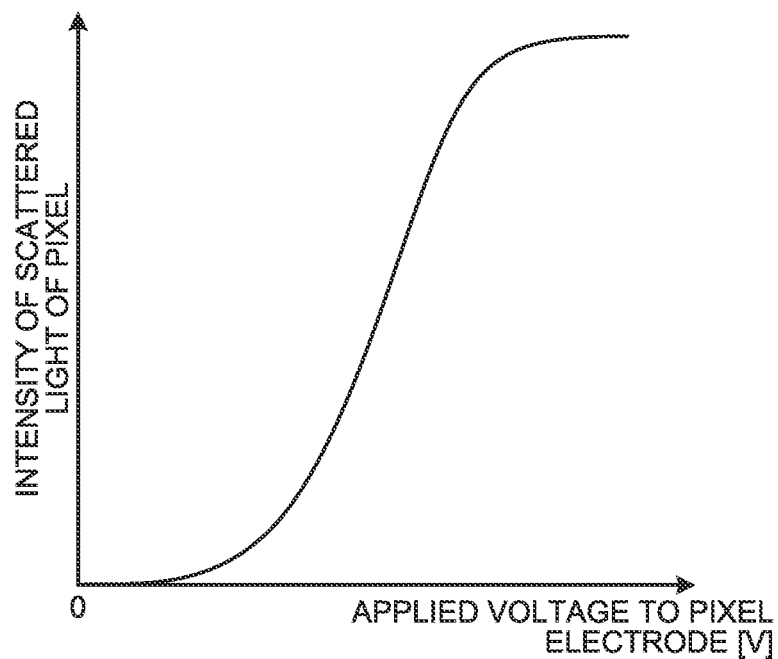
FIG. 4 is an explanatory diagram illustrating a relationship between a voltage applied to a pixel electrode and intensity of scattered light.
Figure 6:
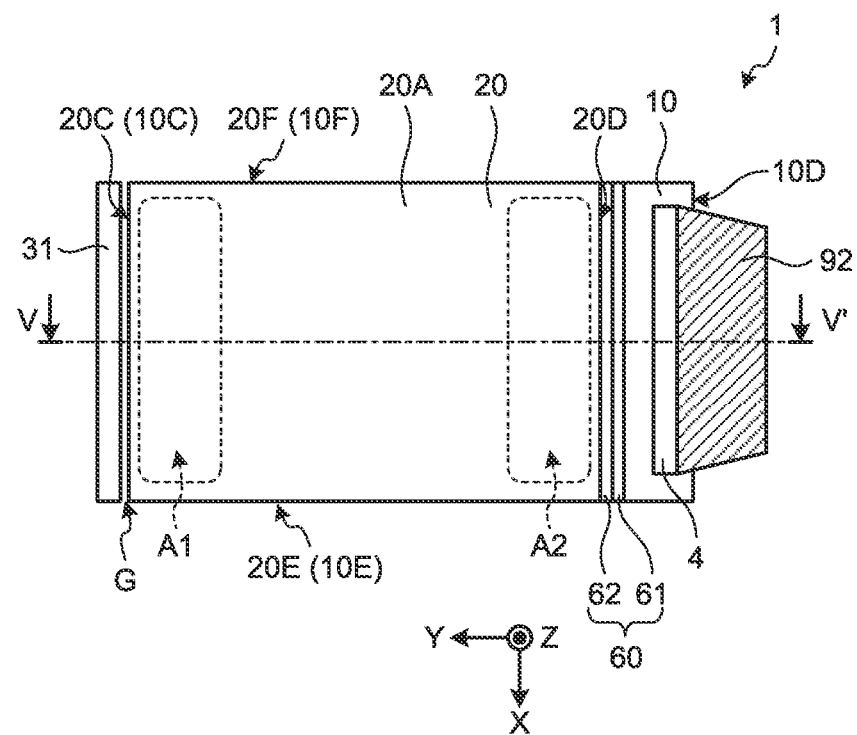
FIG. 6 is a plan view illustrating a plane of the display apparatus of FIG. 1.
Figure 7:
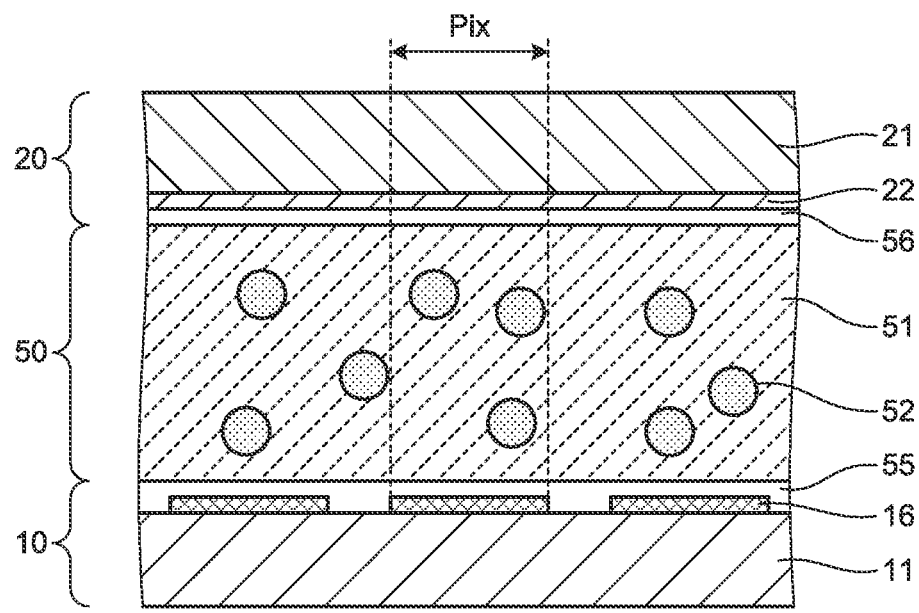
FIG. 7 is an enlarged cross-sectional view of a liquid crystal layer section of FIG. 5.
Figure 8:
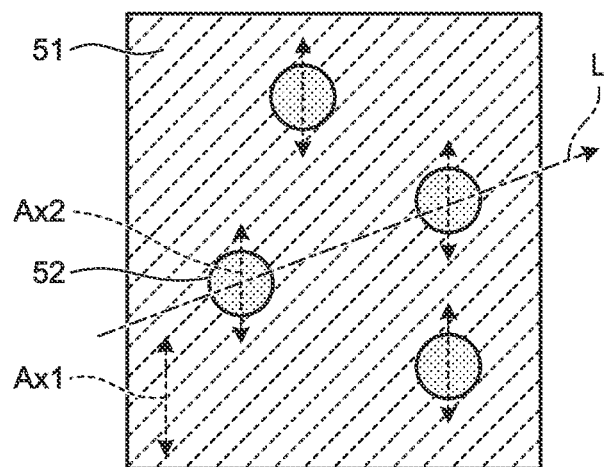
FIG. 8 is a cross-sectional view for describing a non-scattering state in the liquid crystal layer.
Figure 9:
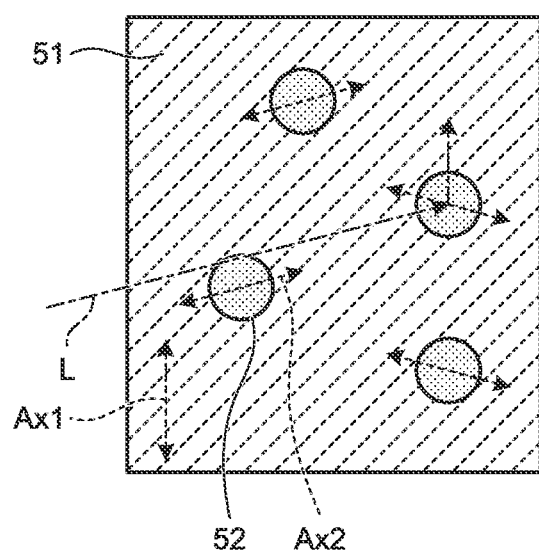
FIG. 9 is a cross-sectional view for describing a scattering state in the liquid crystal layer.

FIG. 4 is an explanatory diagram illustrating a relationship between a voltage applied to a pixel electrode and intensity of scattered light. FIG. 5 is a cross-sectional view illustrating an example of a cross-section of the display apparatus of FIG. 1. FIG. 6 is a plan view illustrating a plane of the display apparatus of FIG. 1. FIG. 7 is an enlarged cross-sectional view of a liquid crystal layer section of FIG. 5. FIG. 8 is a cross-sectional view for describing a non-scattering state in the liquid crystal layer. FIG. 9 is a cross-sectional view for describing a scattering state in the liquid crystal layer.

If the gradation signal according to the output gradation value of each of the pixels Pix selected within the one vertical scanning period GateScan is supplied to each of the above-described signal lines 13, a voltage applied to the pixel electrode 16 is changed according to the gradation signal. If the voltage applied to the pixel electrode 16 is changed, a voltage between the pixel electrode 16 and the common electrode 22 is changed. Then, as illustrated in FIG. 4, the scattering state of the liquid crystal layer 50 of each pixel Pix is controlled, and the intensity of scattered light of the pixel Pix is changed, according to the voltage applied to the pixel electrode 16.

As illustrated in FIGS. 5 and 6, the first light-transmissive substrate 10 includes a first principal surface 10A, a second principal surface 10B, a first side surface 10C, a second side surface 10D, a third side surface 10E, and a fourth side surface 10F. The first principal surface 10A and the second principal surface 10B are planes parallel to each other. The first side surface 10C and the second side surface 10D are planes parallel to each other. The third side surface 10E and the fourth side surface 10F are planes parallel to each other.

As illustrated in FIGS. 5 and 6, the second light-transmissive substrate 20 includes a first principal surface 20A, a second principal surface 20B, a first side surface 20C, a second side surface 20D, a third side surface 20E, and a fourth side surface 20F. The first principal surface 20A and the second principal surface 20B are planes parallel to each other. The first side surface 20C and the second side surface 20D are planes parallel to each other. The third side surface 20E and the fourth side surface 20F are planes parallel to each other.

As illustrated in FIGS. 5 and 6, the light-emitting device 31 is provided to face the first side surface 20C of the second light-transmissive substrate 20. As illustrated in FIG. 5, the light-emitting device 31 irradiates the first side surface 20C of the second light-transmissive substrate 20 with light L. The first side surface 20C, which faces the light-emitting device 31, of the second light-transmissive substrate 20 serves as a light incident surface. A gap G is provided between the light-emitting device 31 and the light incident surface. The gap G serves as an air layer.

As illustrated in FIG. 5, the light L emitted from the light-emitting device 31 propagates in a direction away from the first side surface 20C while being reflected at the first principal surface 10A of the first light-transmissive substrate 10 and the first principal surface 20A of the second light-transmissive substrate 20. When the light L proceeds from the first principal surface 10A of the first light-transmissive substrate 10 or the first principal surface 20A of the second light-transmissive substrate 20 toward the outside, the light L proceeds from a medium having a large refractive index to a medium having a small refractive index. Thus, if an incident angle of the light L entering the first principal surface 10A of the first light-transmissive substrate 10 or the first principal surface 20A of the second light-transmissive substrate 20 is larger than a critical angle, the light L is totally reflected at the first principal surface 10A of the first light-transmissive substrate 10 or the first principal surface 20A of the second light-transmissive substrate 20.

As illustrated in FIG. 5, the light L that has propagated through the first light-transmissive substrate 10 and the second light-transmissive substrate 20 is scattered in the pixel Pix having a liquid crystal in the scattering state, and scattered light with the incident angle smaller than the critical angle is radiated from the first principal surface 10A of the first light-transmissive substrate 10 or the first principal surface 20A of the second light-transmissive substrate 20 to the outside. The light radiated from the first principal surface 10A of the first light-transmissive substrate 10 or the first principal surface 20A of the second light-transmissive substrate 20 is observed by an observer. The following describes the polymer dispersed liquid crystals in a scattering state and the polymer dispersed liquid crystals in a non-scattering state with reference to FIGS. 7 to 9.

As illustrated in FIG. 7, the first light-transmissive substrate 10 is provided with a first orientation film 55. The second light-transmissive substrate 20 is provided with a second orientation film 56. The first orientation film 55 and the second orientation film 56 are, for example, vertical orientation films.

A solution in which liquid crystals are dispersed in monomers is sealed between the first light-transmissive substrate 10 and the second light-transmissive substrate 20. Next, the monomers are polymerized by ultraviolet rays or heat in a state where the monomers and the liquid crystals are oriented by the first orientation film 55 and the second orientation film 56 to form a bulk 51. This process forms the liquid crystal layer 50 including the polymer dispersed liquid crystals in a reverse mode in which the liquid crystals are dispersed in gaps of a polymer network formed in a mesh manner.

In this way, the liquid crystal layer 50 includes the bulk 51 formed of the polymer, and a plurality of fine particles 52 dispersed in the bulk 51. The fine particles 52 are formed of the liquid crystals. The bulk 51 and the fine particles 52 each have optical anisotropy.

The orientation of the liquid crystals included in the fine particles 52 is controlled by a voltage difference between the pixel electrode 16 and the common electrode 22. The orientation of the liquid crystals is changed by the voltage applied to the pixel electrode 16. The degree of scattering of the light that passes through the pixel Pix is changed in accordance with the change of the orientation of the liquid crystals.

For example, as illustrated in FIG. 8, in a state in which no voltage is applied between the pixel electrode 16 and the common electrode 22, the direction of an optical axis Ax1 of the bulk 51 and the direction of an optical axis Ax2 of the fine particle 52 are the same. The optical axis Ax2 of the fine particle 52 is parallel to the Z direction of the liquid crystal layer 50. The optical axis Ax1 of the bulk 51 is parallel to the Z direction of the liquid crystal layer 50 regardless of whether or not a voltage is applied thereto.

An ordinary light refractive index of the bulk 51 and that of the fine particles 52 are equal to each other. A light refractive index of the bulk 51 and that of the fine particles 52 are equal to each other. In a state in which no voltage is applied between the pixel electrode 16 and the common electrode 22, a difference in the refractive indexes between the bulk 51 and the fine particles 52 becomes zero in all directions. The liquid crystal layer 50 becomes the non-scattering state in which the liquid crystal layer 50 does not scatter the light L. The light L propagates in a direction away from the light-emitting device 31 while being reflected at the first principal surface 10A of the first light-transmissive substrate 10 and the first principal surface 20A of the second light-transmissive substrate 20. When the liquid crystal layer 50 is in the non-scattering state in which the liquid crystal layer 50 does not scatter the light L, a background on the first principal surface 20A side of the second light-transmissive substrate 20 is visually recognized from the first principal surface 10A of the first light-transmissive substrate 10, and a background on the first principal surface 10A side of the first light-transmissive substrate 10 is visually recognized from the first principal surface 20A of the second light-transmissive substrate 20.

As illustrated in FIG. 9, the optical axis Ax2 of the fine particle 52 is inclined by an electric field formed between the pixel electrode 16 and the common electrode 22 to which a voltage is applied. Since the optical axis Ax1 of the bulk 51 remains unchanged by the electric field, the direction of the optical axis Ax1 of the bulk 51 and the direction of the optical axis Ax2 of the fine particle 52 are different from each other. The light L is scattered in the pixel Pix having the pixel electrode 16 to which a voltage is applied. As described above, a part of the scattered light L radiated from the first principal surface 10A of the first light-transmissive substrate 10 or the first principal surface 20A of the second light-transmissive substrate 20 to the outside is observed by an observer.

The display apparatus 1 of the first embodiment displays an image by combining the pixel Pix having the pixel electrode 16 to which a voltage is applied and the pixel Pix having the pixel electrode 16 to which no voltage is applied. In the pixel Pix having the pixel electrode 16 to which no voltage is applied, the background on the first principal surface 20A side of the second light-transmissive substrate 20 is visually recognized from the first principal surface 10A of the first light-transmissive substrate 10, and the background on the first principal surface 10A side of the first light-transmissive substrate 10 is visually recognized from the first principal surface 20A of the second light-transmissive substrate 20. The image displayed by the light L scattered and radiated to the outside from the pixel Pix having the pixel electrode 16 to which a voltage is applied superimposes the background to be displayed.

Figure 10:
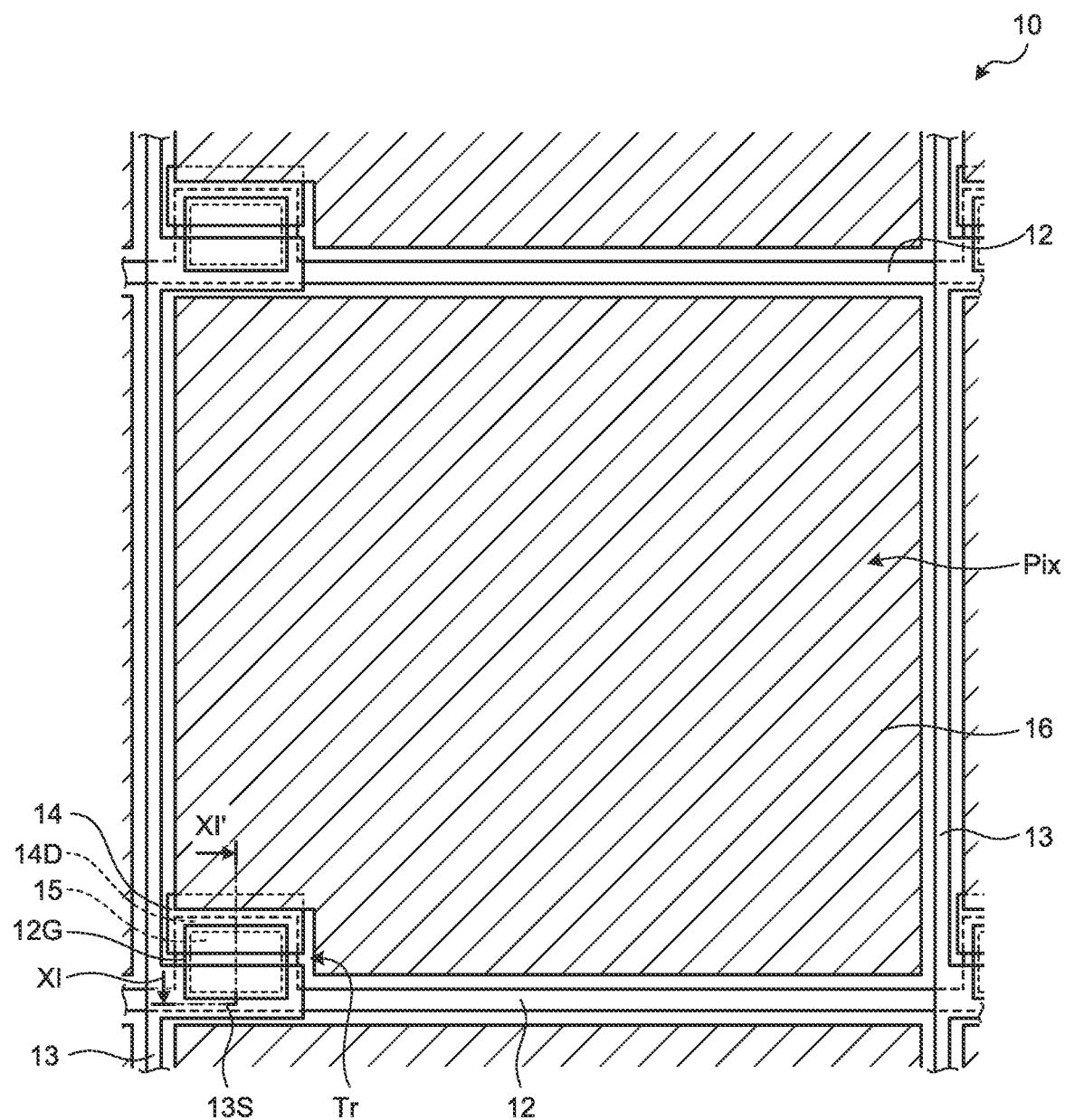
FIG. 10 is a plan view illustrating a pixel.
Figure 11:
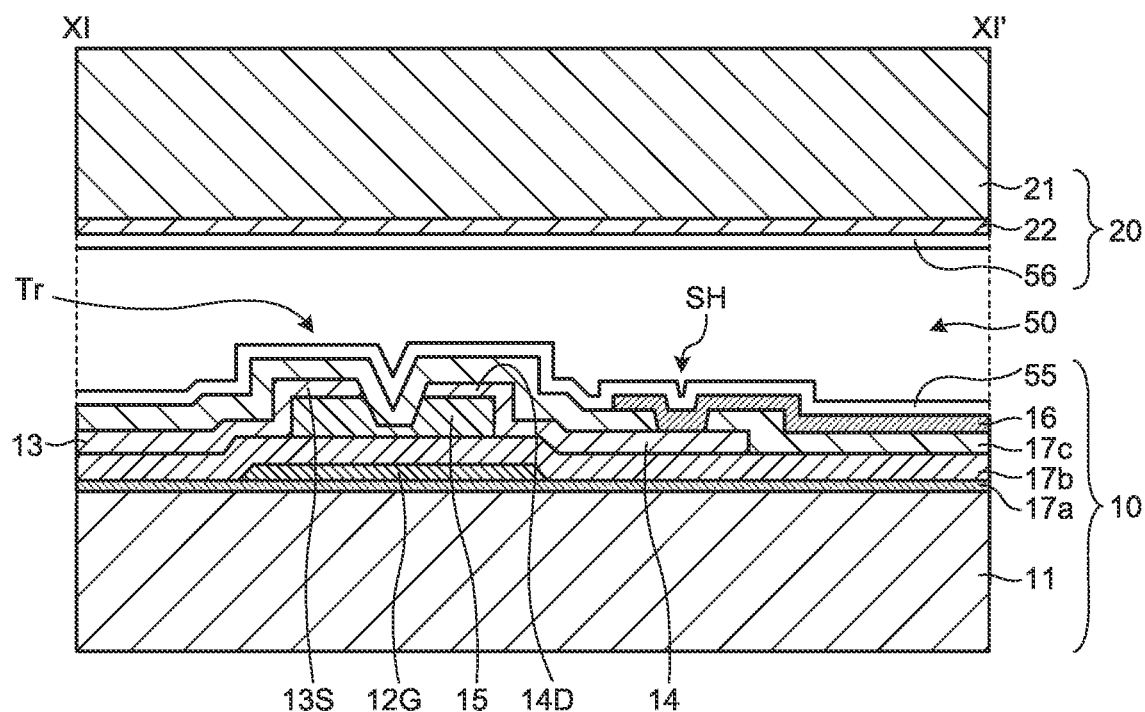
FIG. 11 is a cross-sectional view illustrating a cross-section taken along line XI-XI' in FIG. 10.

FIG. 10 is a plan view illustrating a pixel. FIG. 11 is a cross-sectional view illustrating a cross-section taken along line XI-XI' in FIG. 10. As illustrated in FIGS. 1, 4, and 10, the first light-transmissive substrate 10 is provided with the signal lines 13 and the scanning lines 12 in a grid manner in plan view. A region surrounded by adjacent scanning lines 12 and adjacent signal lines 13 is the pixel Pix. The pixel Pix is provided with the pixel electrode 16 and the switching element Tr. In the first embodiment, the switching element Tr is a bottom gate thin film transistor. The switching element Tr includes a semiconductor layer 15 superimposed on a gate electrode 12G electrically coupled with the scanning line 12 in plan view.

The scanning line 12 is wiring made of a metal such as molybdenum (Mo) or aluminum (Al), a layered body of the aforementioned metal, or an alloy of the aforementioned metal. The signal line 13 is wiring made of a metal such as aluminum, or an alloy.

The semiconductor layer 15 is provided not to protrude from the gate electrode 12G in plan view. This configuration causes the light L proceeding from the gate electrode 12G side toward the semiconductor layer 15 to be reflected, and is less likely to cause leakage of light in the semiconductor layer 15.

As illustrated in FIG. 10, a source electrode 13S electrically coupled with the signal line 13 is superimposed on one end portion of the semiconductor layer 15 in plan view.

As illustrated in FIG. 10, a drain electrode 14D is provided in a position adjacent to the source electrode 13S across a central portion of the semiconductor layer 15 in plan view. The drain electrode 14D is superimposed on the other end portion of the semiconductor layer 15 in plan view. A portion of the semiconductor layer 15 not superimposed on the source electrode 13S and the drain electrode 14D functions as a channel of the switching element Tr. As illustrated in FIG. 11, conductive wiring 14 coupled with the drain electrode 14D is electrically coupled with the pixel electrode 16 through a through hole SH.

As illustrated in FIG. 11, the first light-transmissive substrate 10 includes a first base material 11 formed of glass, for example. The first base material 11 may be a formed of a resin such as polyethylene terephthalate as long as the resin has light-transmissive properties. A first insulating layer 17a is provided on the first base material 11, and the scanning line 12 and the gate electrode 12G are provided on the first insulating layer 17a. A second insulating layer 17b is provided to cover the scanning line 12. The first insulating layer 17a and the second insulating layer 17b are formed of a transparent inorganic insulating member such as silicon nitride.

The semiconductor layer 15 is stacked on the second insulating layer 17b. The semiconductor layer 15 is formed of amorphous silicon. However, the semiconductor layer 15 may be formed of polysilicon or an oxide semiconductor.

The source electrode 13S that covers a part of the semiconductor layer 15, the signal line 13, and the drain electrode 14D that covers a part of the semiconductor layer 15 are provided on the second insulating layer 17b. The signal line 13 and the drain electrode 14D are formed of the same material. A third insulating layer 17c is provided on the semiconductor layer 15, the signal line 13, and the drain electrode 14D. The third insulating layer 17c is formed of a transparent inorganic insulating member such as silicon nitride.

The pixel electrode 16 is provided on the third insulating layer 17c. The pixel electrode 16 is formed of a light-transmissive conductive member such as indium tin oxide (ITO). The pixel electrode 16 is electrically coupled with the conductive wiring 14 and the drain electrode 14D through a contact hole provided in the third insulating layer 17c. The first orientation film 55 is provided on the pixel electrode 16.

The second light-transmissive substrate 20 includes a second base material 21 formed of glass, for example. The second base material 21 may be a resin such as polyethylene terephthalate as long as the resin has light-transmissive properties. The common electrode 22 is provided on the second base material 21. The common electrode 22 is formed of a light-transmissive conductive member such as ITO. The second orientation film 56 is provided on the common electrode 22.

Figure 12:
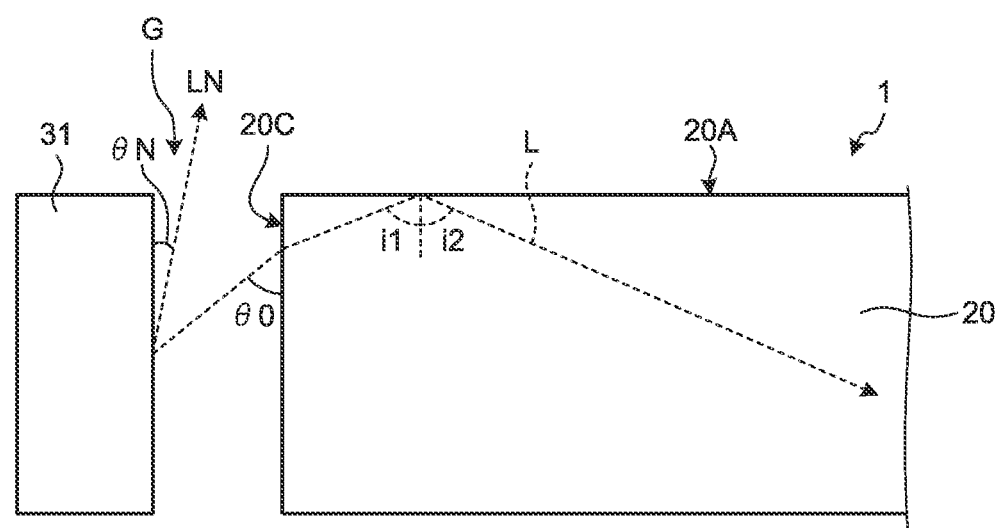
FIG. 12 is a diagram for describing incident light from a light-emitting device.

FIG. 12 is a diagram for describing incident light from a light-emitting device. When the light from the light-emitting device 31 enters the first side surface 20C of the second light-transmissive substrate 20 at an angle θ0, the light enters the first principal surface 20A of the second light-transmissive substrate 20 at an angle i1. If the angle i1 is larger than the critical angle, the light totally reflected at the first principal surface 20A of the second light-transmissive substrate 20 at an angle i2 propagates through the second light-transmissive substrate 20. Since the gap G is provided between the light-emitting device 31 and the first side surface 20C (light incident surface) illustrated in FIG. 12, light LN with an angle θN by which the angle i1 becomes smaller than the critical angle is not guided to the first side surface 20C of the second light-transmissive substrate 20.

Figure 13:
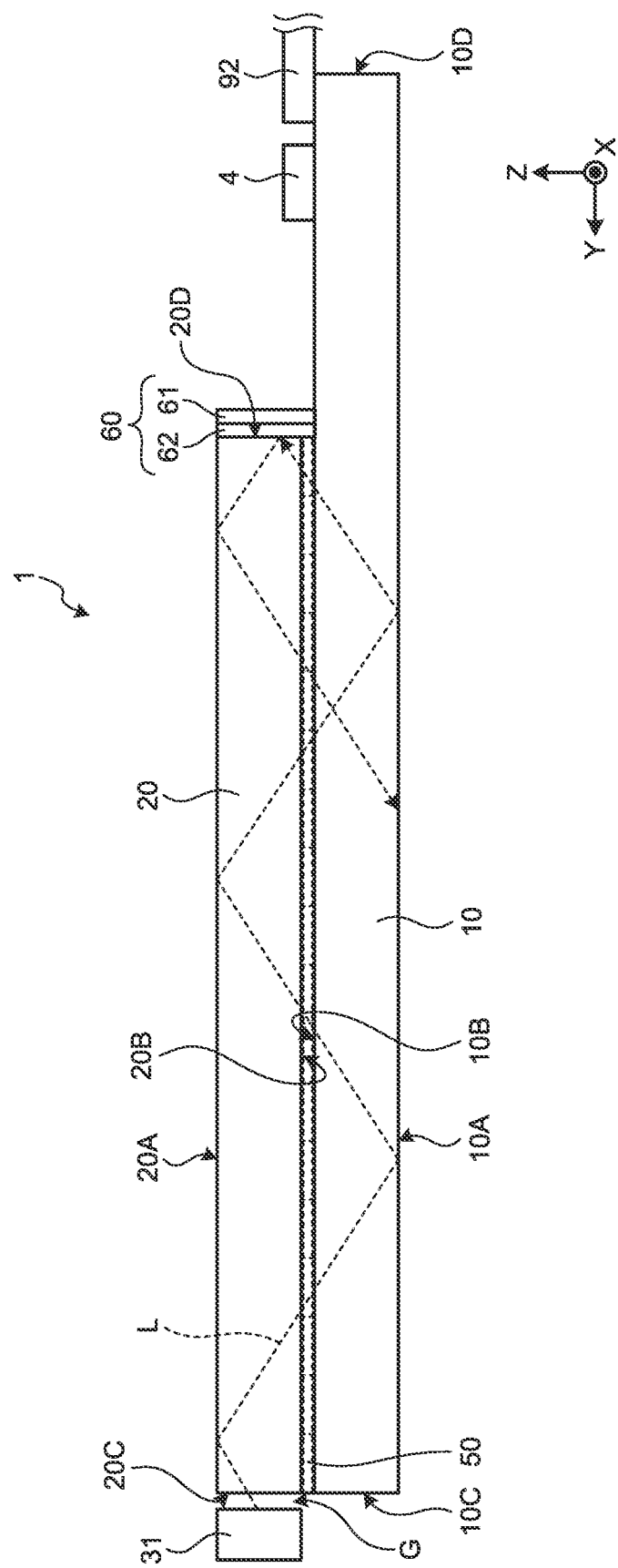
FIG. 13 is a cross-sectional view illustrating another example of a cross-section taken along line V-V' in FIG. 6.
Figure 14:
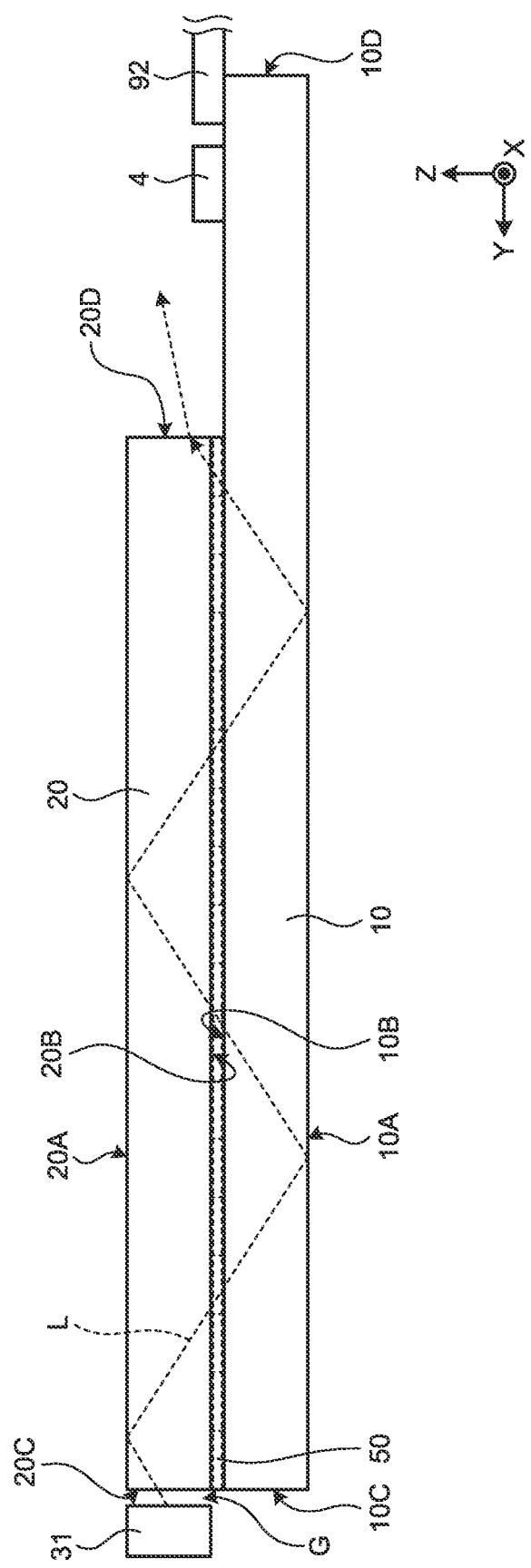
FIG. 14 is a cross-sectional view illustrating a comparative example of FIG. 13.

FIG. 13 is a cross-sectional view illustrating another example of a cross-section taken along line V-V in FIG. 6. FIG. 14 is a cross-sectional view of a comparative example of FIG. 13. The display apparatus of the first embodiment is provided with a reflector 60 that reflects light, on the second side surface 20D of the second light-transmissive substrate 20, as illustrated in FIGS. 5, 6, and 13. The second side surface 20D is perpendicular to the first principal surface 20A of the second light-transmissive substrate 20. Thus, even if the light L has been totally reflected at the first principal surface 10A of the first light-transmissive substrate 10 or the first principal surface 20A of the second light-transmissive substrate 20, an angle of the light L entering the second side surface 20D becomes smaller than the critical angle. In a display apparatus of a comparative example illustrated in FIG. 14, in which no reflector 60 is provided, light leaks from the second side surface 20D, and the light amount in a region A2 close to the second side surface 20D becomes smaller than that in a region A1 close to the light-emitting device 31, as illustrated in FIG. 6.

In contrast, the display apparatus of the first embodiment is provided with the reflector 60 that reflects the light, on the second side surface 20D of the second light-transmissive substrate 20, as illustrated in FIGS. 5, 6, and 13. The reflector 60 includes a reflection layer 61, and a light-transmissive adhesive layer 62 that affixes the reflection layer 61 to the second side surface 20D. The reflection layer 61 is formed of aluminum or silver, for example, in a film manner, and can employ any material as long as the material has high reflectance. The adhesive layer 62 is an optical elastic resin that fixes the reflection layer 61 to the second side surface 20D by ultraviolet curing. The refractive index of the adhesive layer 62 is preferably equal to or less than that of the first light-transmissive substrate 10 or the second light-transmissive substrate 20.

Figure 15:
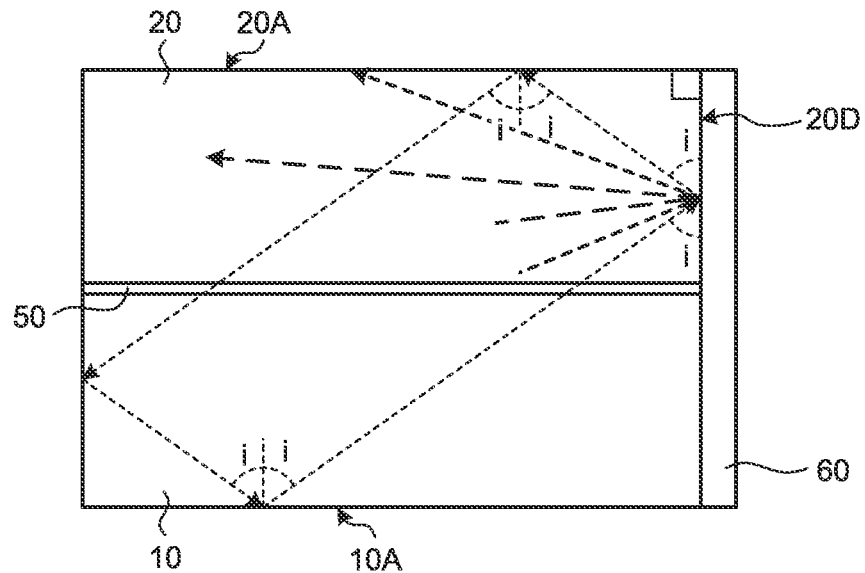
FIG. 15 is a schematic cross-sectional view for describing a state of light reflected at a side surface when principal surfaces and side surfaces of light-transmissive substrates are at right angles.
Figure 16:
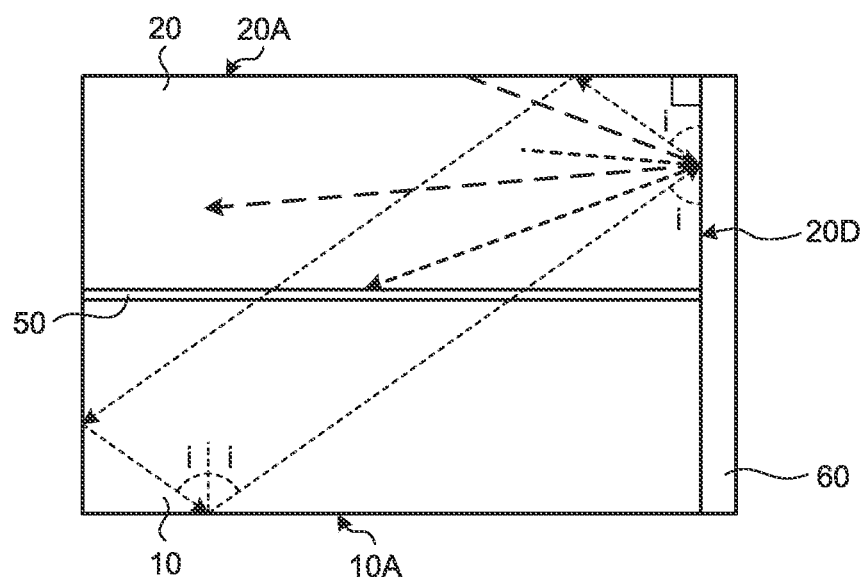
FIG. 16 is a schematic cross-sectional view for describing a state of light reflected at a side surface when principal surfaces and side surfaces of light-transmissive substrates are at right angles.
Figure 17:
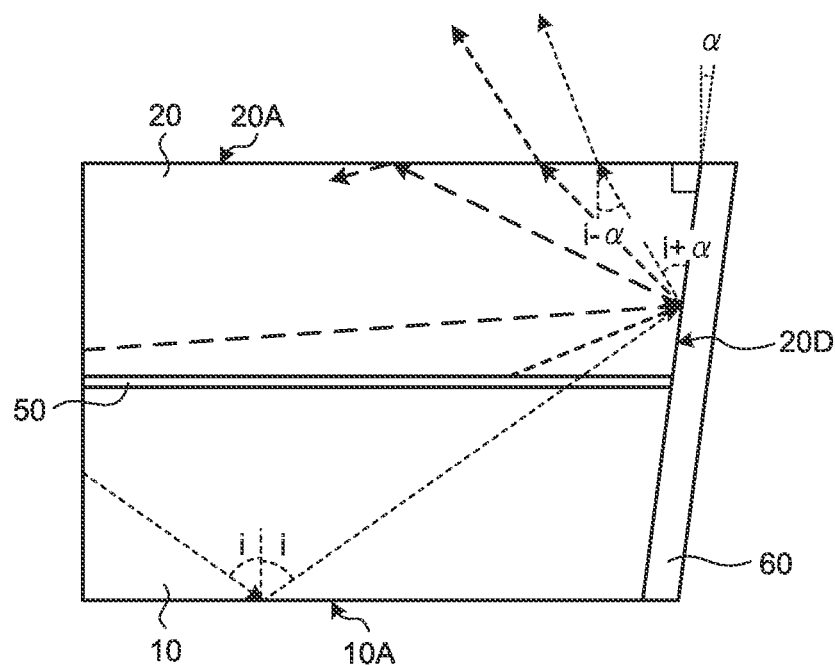
FIG. 17 is a schematic cross-sectional view for describing a state of light reflected at a side surface when principal surfaces and side surfaces of light-transmissive substrates are not at right angles.
Figure 18:
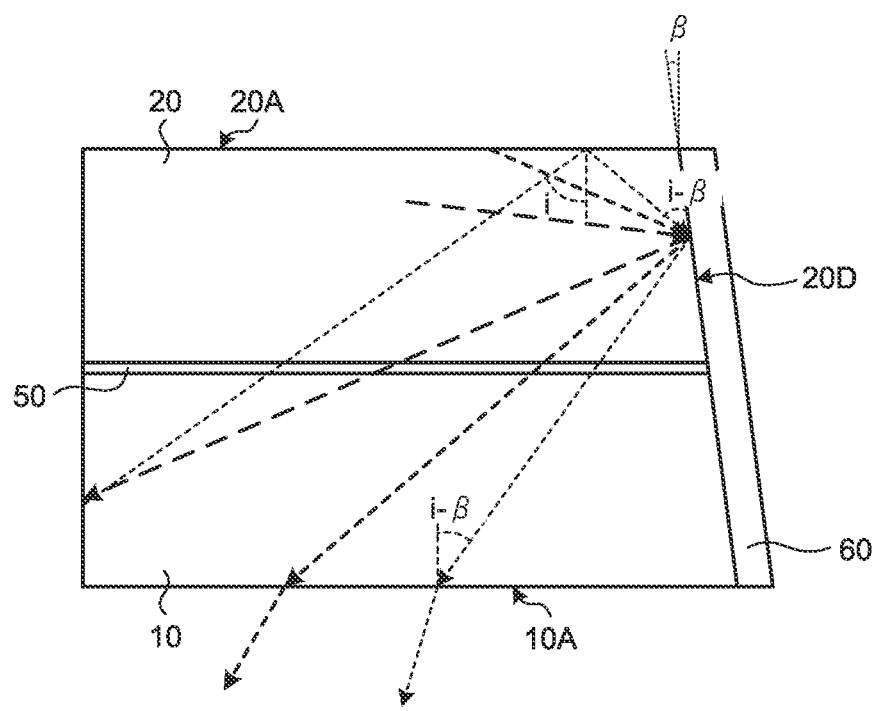
FIG. 18 is a schematic cross-sectional view for describing a state of light reflected at a side surface when principal surfaces and side surfaces of light-transmissive substrates are not at right angles.

FIGS. 15 and 16 are schematic cross-sectional views each describing a state of light reflected at a side surface when principal surfaces and side surfaces of light-transmissive substrates are at right angles. FIGS. 17 and 18 are schematic cross-sectional views each describing a state of light reflected at a side surface when principal surfaces and side surfaces of a light-transmissive substrate are not at right angles. In FIGS. 15 and 16, an angle at which the light is totally reflected at the first principal surface 10A of the first light-transmissive substrate 10 or the first principal surface 20A of the second light-transmissive substrate 20 is a critical angle i. As illustrated in FIGS. 15 and 16, in the first embodiment, the first principal surface 20A and the second side surface 20D of the second light-transmissive substrate 20 are perpendicular to each other. This configuration allows the light that has been totally reflected at the first principal surface 10A of the first light-transmissive substrate 10 or the first principal surface 20A of the second light-transmissive substrate 20 to be totally reflected at the first principal surface 10A of the first light-transmissive substrate 10 or the first principal surface 20A of the second light-transmissive substrate 20 even after having been reflected at the second side surface 20D by the reflector 60.

In contrast, as illustrated in FIG. 17, when the first principal surface 20A and the second side surface 20D of the second light-transmissive substrate 20 are inclined by an angle α, an inclination corresponding to the angle α is added to the angle at which the light is reflected at the second side surface 20D, which increases the amount of light entering the first principal surface 20A of the second light-transmissive substrate 20 at an angle smaller than the critical angle i, and causes light leakage from the first principal surface 20A of the second light-transmissive substrate 20.

Similarly, as illustrated in FIG. 18, when the first principal surface 20A and the second side surface 20D of the second light-transmissive substrate 20 are inclined at an angle β, an inclination corresponding to the angle β is added to the angle at which the light is reflected at the second side surface 20D, which increases the amount of light entering the first principal surface 10A of the first light-transmissive substrate 10 at an angle smaller than the critical angle i, and causes light leakage from the first principal surface 10A of the first light-transmissive substrate 10.

As described above, in the first embodiment, the first principal surface 20A and the second side surface 20D of the second light-transmissive substrate 20 being at right angles can cause the light reflected by the reflector 60 to be more easily reflected at the first principal surface 20A of the second light-transmissive substrate 20.

The display apparatus 1 of the first embodiment includes the first light-transmissive substrate 10, the second light-transmissive substrate 20, the liquid crystal layer 50, the light-emitting device 31, and the reflector 60. The second light-transmissive substrate 20 is arranged to face the first light-transmissive substrate 10. The liquid crystal layer 50 includes the polymer dispersed liquid crystals sealed between the first light-transmissive substrate 10 and the second light-transmissive substrate 20. The light-emitting device 31 is arranged to face the first side surface 20C of the second light-transmissive substrate 20. The reflector 60 is arranged on the second side surface 20D on the opposite side of the first side surface 20C on the light-emitting device 31 side, and the reflector 60 reflects the light at the second side surface 20D. According to this configuration, a backlight device or a reflection plate is not provided on the first principal surface 10A side of the first light-transmissive substrate 10 or the first principal surface 20A side of the second light-transmissive substrate 20. Therefore, the background on the first principal surface 20A side of the second light-transmissive substrate 20 is visually recognized from the first principal surface 10A of the first light-transmissive substrate 10, or the background on the first principal surface 10A side of the first light-transmissive substrate 10 is visually recognized from the first principal surface 20A of the second light-transmissive substrate 20. The light is reflected at the second side surface 20D by the reflector 60, and thus a difference in the light amount between the region A2 close to the second side surface 20D and the region A1 close to the light-emitting device 31 becomes small, as illustrated in FIG. 6.

Further, the display apparatus 1 of the first embodiment does not include a polarizing plate on the first principal surface 10A side of the first light-transmissive substrate 10 or the first principal surface 20A side of the second light-transmissive substrate 20. Therefore, when the background on the first principal surface 20A side of the second light-transmissive substrate 20 from the first principal surface 10A of the first light-transmissive substrate 10, or when the background on the first principal surface 10A side of the first light-transmissive substrate 10 from the first principal surface 20A of the second light-transmissive substrate 20 are observed, the background can be visually recognized in a clear manner because of high transmittance.

First Modification of First Embodiment

Figure 19:
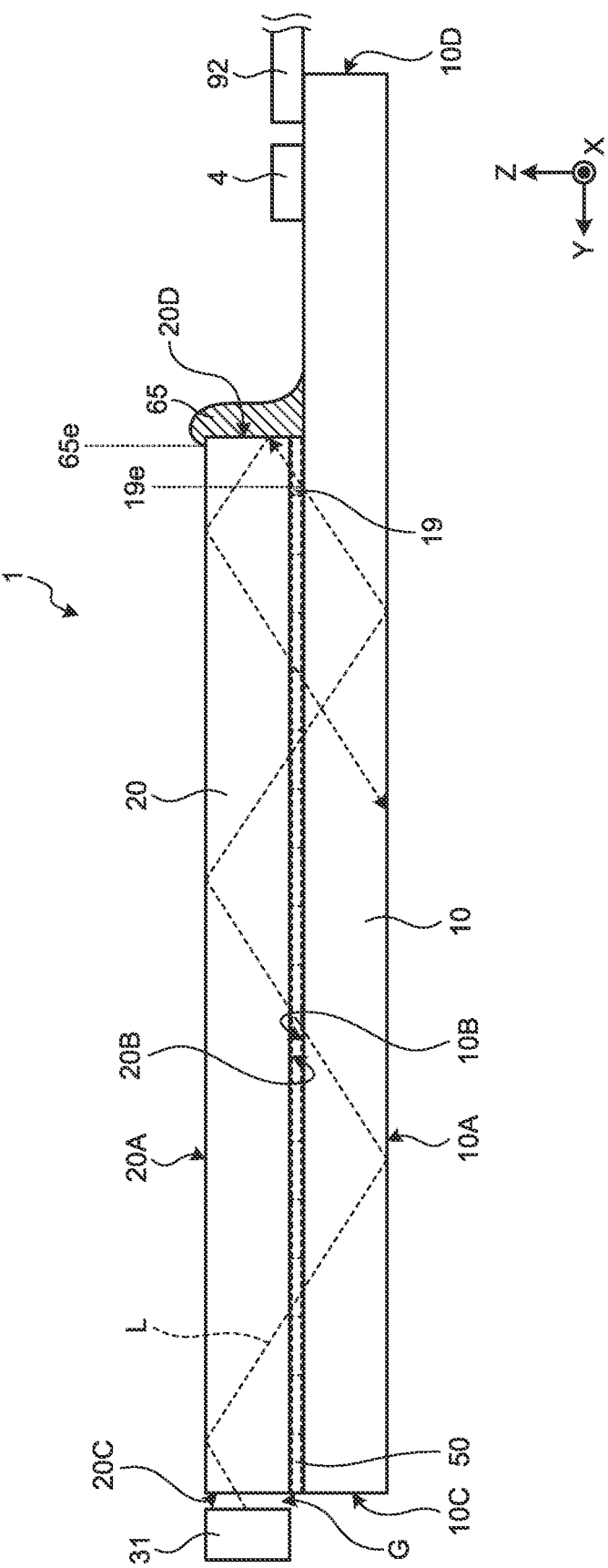
FIG. 19 is a cross-sectional view illustrating an example of a cross-section of a display apparatus according to a first modification of the first embodiment.

FIG. 19 is a cross-sectional view illustrating an example of a cross-section of a display apparatus according to a first modification of the first embodiment. The same configuration elements as those described in the above first embodiment are denoted with the same reference signs, and overlapping description is omitted.

A reflector 65 of the first modification of the first embodiment is obtained by solidifying metal particles of aluminum or silver to have a paste form. Any material can be used for the reflector 65 as long as the material has high reflectance. To apply the reflection portion 65 to the entire surface of a second side surface 20D of a second light-transmissive substrate 20, a part of the reflector 65 should protrude to a first principal surface 20A of the second light-transmissive substrate 20. A paste edge portion 65e that is an edge of the paste is preferably provided on the second side surface 20D side without extending to an end portion 19e on the second side surface 20D side of a sealant 19. This configuration lowers a possibility of the paste edge portion 65e influencing a display region of a display apparatus 1.

Second Modification of First Embodiment

Figure 20:
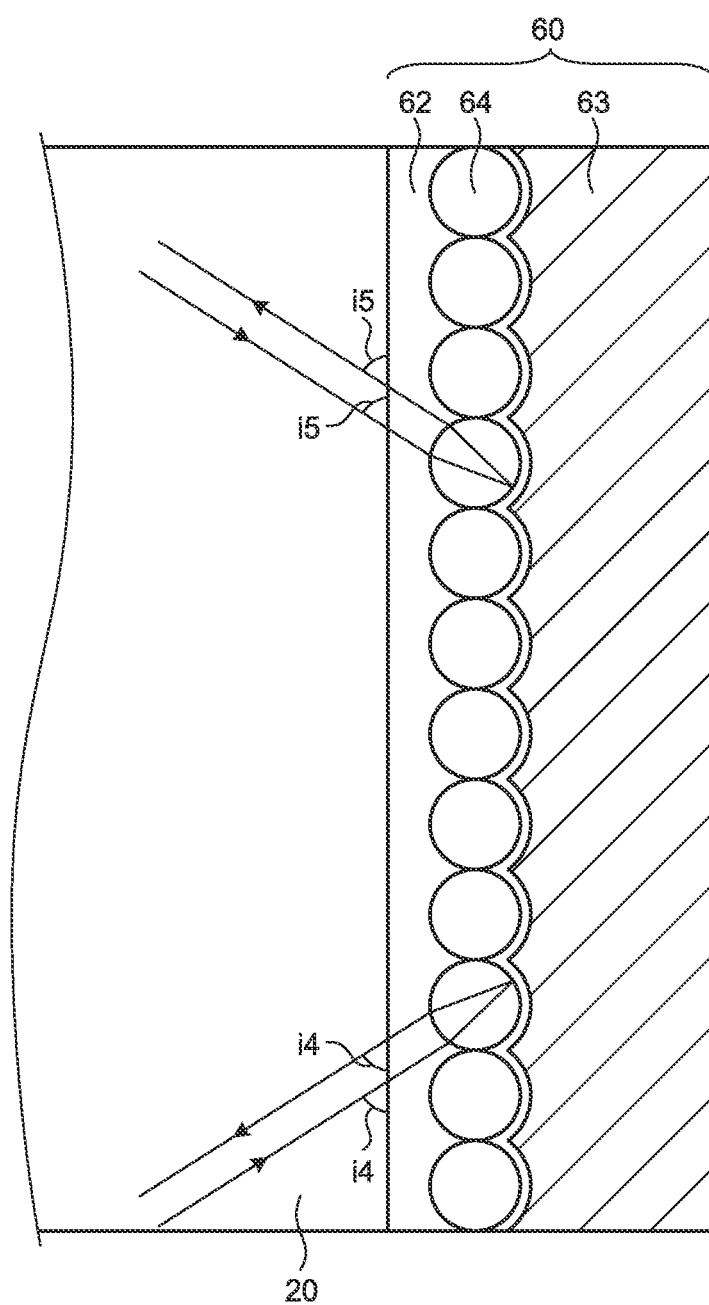
FIG. 20 is a cross-sectional view illustrating an example of a cross-section of a display apparatus according to a second modification of the first embodiment.

FIG. 20 is a cross-sectional view illustrating an example of a cross-section of a display apparatus according to a second modification of the first embodiment. The same configuration elements as those described in the above first embodiment are denoted with the same reference signs, and overlapping description is omitted.

A reflector 60 of the second modification of the first embodiment is a retroreflection structural body that enables retroreflection in which light having entered the retroreflection structural body at an incident angle is reflected at an emission angle that is the same angle as the incident angle. The reflector 60 includes a reflection base material 63, a light-transmissive spherical body 64, and an adhesive layer 62. The reflection base material 63 is a metal film made of aluminum or silver, and can employ any material as long as the material has high reflectance. The light-transmissive spherical body 64 is formed of glass or the like. For example, as illustrated in FIG. 20, light having entered the reflector 60 at an angle i4 with respect to a second side surface 20D of a second light-transmissive substrate 20 is concentrated in one point by lens effect, is reflected at a bottom portion of the light-transmissive spherical body 64, and is emitted from the reflector 60 at the angle i4 with respect to the second side surface 20D of the second light-transmissive substrate 20. Similarly, light having entered the reflector 60 at an angle i5 with respect to the second side surface 20D of the second light-transmissive substrate 20, which is different from the angle i4, is concentrated in one point by lens effect, is reflected at the bottom portion of the light-transmissive spherical body 64, and is emitted from the reflector 60 at the angle i5 with respect to the second side surface 20D of the second light-transmissive substrate 20.

When the reflector 60 is the retroreflection structural body, light can be reflected in a direction parallel to a direction in which the light has entered. Thus, even if the second side surface 20D of the second light-transmissive substrate 20 is not at a right angle with a first principal surface 20A of the second light-transmissive substrate 20, the light reflected at the reflector 60 can be more easily reflected at the first principal surface 20A of the second light-transmissive substrate 20.

According to another aspect, the reflector 60 may be a retroreflection structural body including a prism layer that enables retroreflection in which light having entered the retroreflection structural body at an incident angle is reflected at an emission angle that is the same angle as the incident angle.

Third Modification of First Embodiment

Figure 21:
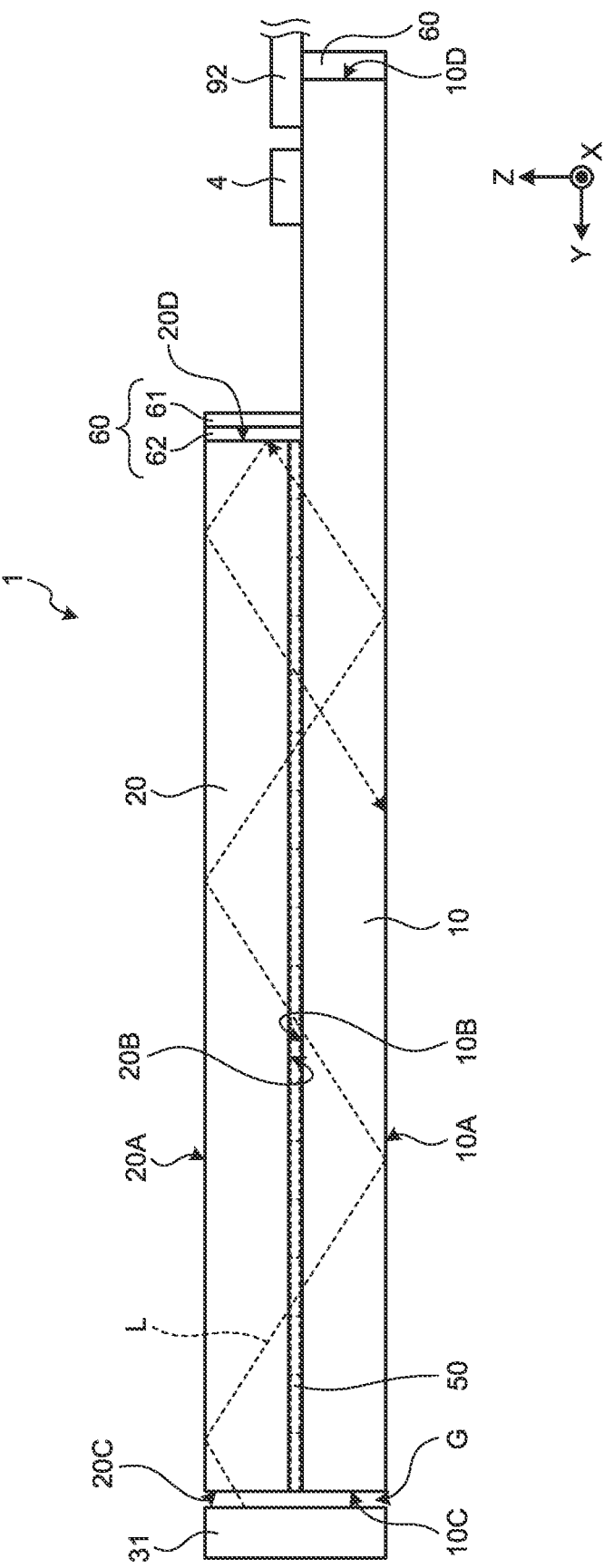
FIG. 21 is a cross-sectional view illustrating an example of a cross-section of a display apparatus according to a third modification of the first embodiment.

FIG. 21 is a cross-sectional view illustrating an example of a cross-section of a display apparatus according to a third modification of the first embodiment. The same configuration elements as those described in the above first embodiment are denoted with the same reference signs, and overlapping description is omitted.

A display apparatus 1 according to the third modification of the first embodiment includes a first light-transmissive substrate 10, a second light-transmissive substrate 20, a liquid crystal layer 50, a light-emitting device 31, and reflectors 60. The light-emitting device 31 is arranged to face a first side surface 10C of the first light-transmissive substrate 10 and a first side surface 20C of the second light-transmissive substrate 20. One reflector 60 is arranged on a second side surface 20D on the opposite side of the first side surface 20C on the light-emitting device 31 side, and reflects the light at the second side surface 20D. Further, another reflector 60 is arranged on a second side surface 10D on the opposite side of the first side surface 10C on the light-emitting device 31 side, and reflects the light at the second side surface 10D. This configuration increases an amount of light emitted from the light-emitting device 31 to the first side surface 10C of the first light-transmissive substrate 10 and the first side surface 20C of the second light-transmissive substrate 20, and propagating through a display panel 2. Further, the configuration improves uniformity of the light propagating through the display panel 2.

The display apparatus 1 according to the third modification of the first embodiment has no backlight device and no reflection plate on the first principal surface 10A side of the first light-transmissive substrate 10 or the first principal surface side of the second light-transmissive substrate 20, similarly to the first embodiment. This configuration allows a background on the first principal surface 20A side of the second light-transmissive substrate 20 to be visually recognized from the first principal surface 10A of the first light-transmissive substrate 10, or a background on the first principal surface 10A side of the first light-transmissive substrate 10 to be visually recognized from the first principal surface 20A of the second light-transmissive substrate 20.

Fourth Modification of First Embodiment

Figure 22:
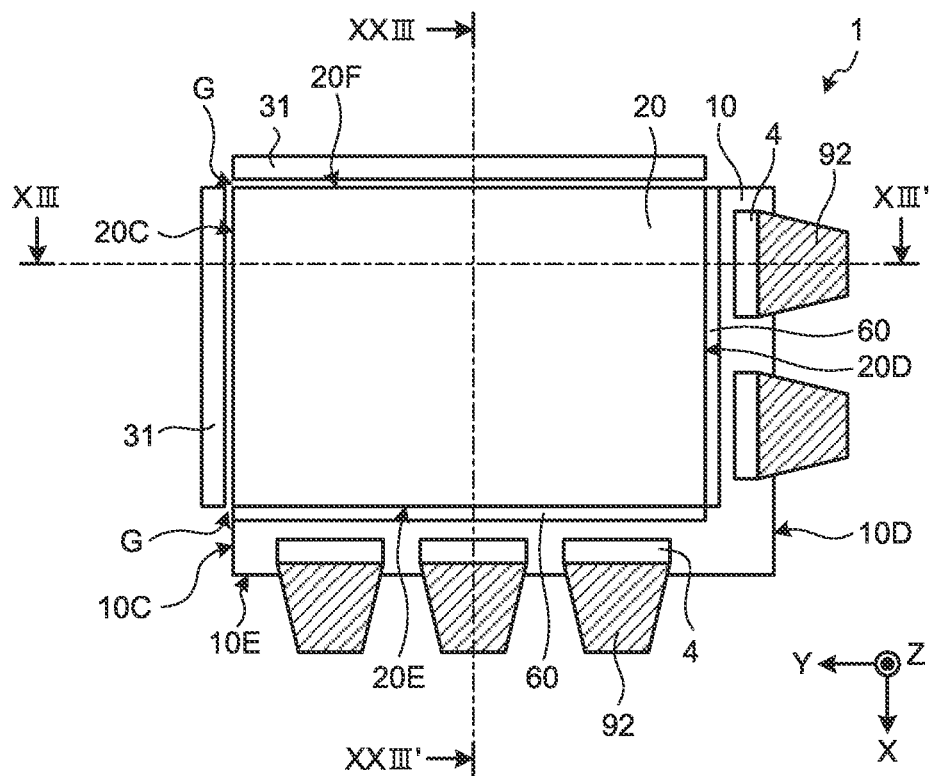
FIG. 22 is a plan view illustrating a plane of a display apparatus according to a fourth modification of the first embodiment.
Figure 23:
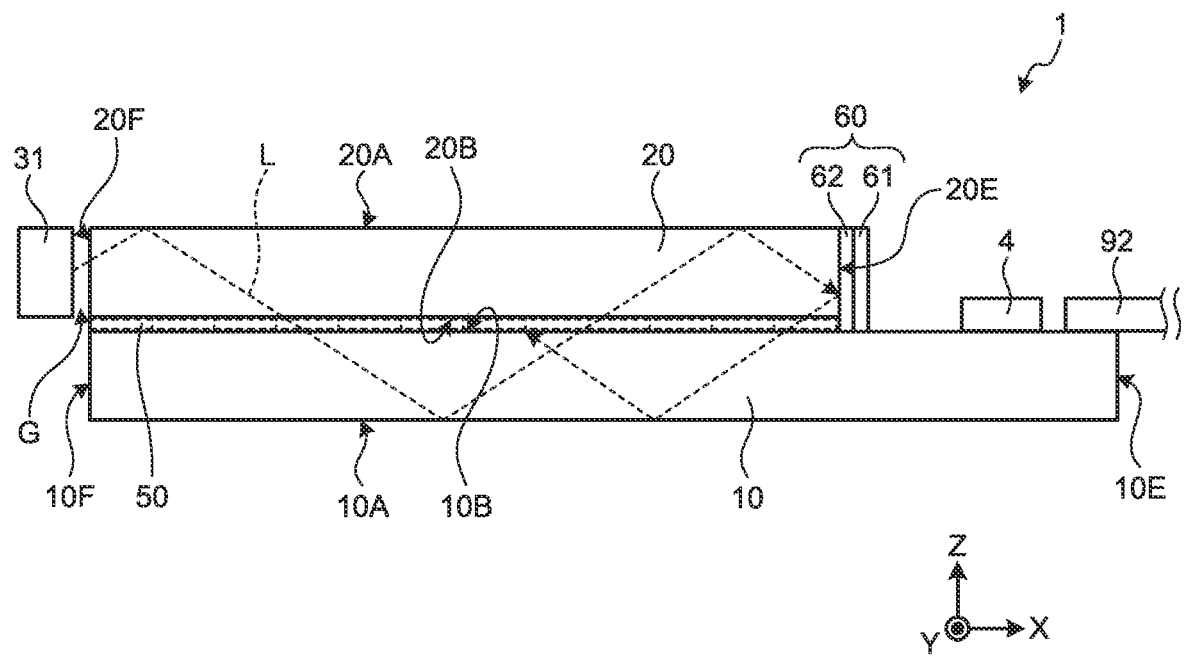
FIG. 23 is a cross-sectional view illustrating a cross-section taken along line XXIII-XXIII' in FIG. 22.

FIG. 22 is a plan view illustrating a plane of a display apparatus according to a fourth modification of the first embodiment. FIG. 23 is a cross-sectional view illustrating a cross-section taken along line XXIII-XXIII' in FIG. 22. The same configuration elements as those described in the above first embodiment are denoted with the same reference signs, and overlapping description is omitted. The cross-section of XIII-XIII' in FIG. 22 is the same as that of the display apparatus of the first embodiment illustrated in FIG. 13, and thus overlapping description is omitted.

As illustrated in FIGS. 22 and 23, a light-emitting device 31 is provided to face a fourth side surface 20F of a second light-transmissive substrate 20. As illustrated in FIG. 23, the light-emitting device 31 irradiates the fourth side surface 20F of the second light-transmissive substrate 20 with light L. The fourth side surface 20F, which faces the light-emitting device 31, of the second light-transmissive substrate 20 serves as a light incident surface. A gap G is provided between the light-emitting device 31 and the light incident surface. The gap G serves as an air layer.

As illustrated in FIG. 23, light L emitted from the light-emitting device 31 propagates in a direction away from the fourth side surface 20F while being reflected at a first principal surface 10A of a first light-transmissive substrate 10 and a first principal surface 20A of the second light-transmissive substrate 20.

As illustrated in FIGS. 22 and 23, a reflector 60 that reflects the light is provided on a third side surface 20E of the second light-transmissive substrate 20. The third side surface 20E is perpendicular to the first principal surface 20A of the second light-transmissive substrate 20. The light is reflected at the third side surface 20E by the reflector 60. The light reflected at the third side surface 20E propagates in a direction away from the third side surface 20E while being reflected at the first principal surface 10A of the first light-transmissive substrate 10 and the first principal surface 20A of the second light-transmissive substrate 20.

A display apparatus 1 according to the fourth modification of first embodiment includes the first light-transmissive substrate 10, the second light-transmissive substrate 20, a liquid crystal layer 50, the light-emitting devices 31, and the reflectors 60. The two light-emitting devices 31 are respectively arranged to face a first side surface 20C and the fourth side surface 20F of the second light-transmissive substrate 20. The reflector 60 is arranged on a second side surface 20D on the opposite side of the first side surface 20C on the light-emitting device 31 side, and reflects the light at the second side surface 20D. Similarly, the reflector 60 is arranged on the third side surface 20E on the opposite side of the fourth side surface 20F on the light-emitting device 31 side, and reflects the light at the third side surface 20E. According to this configuration, the light is reflected at the second side surface 20D and the third side surface 20E by the two reflectors 60, which decreases a difference between amounts of the light emitted from the two light-emitting devices 31 and propagating through the display panel 2, and increases the amounts of the light emitted from the two light-emitting devices 31 and propagating through the display panel 2. Further, the configuration improves uniformity of the light propagating through the display panel 2.

The display apparatus 1 according to the fourth modification of the first embodiment has no backlight device and no reflection plate on the first principal surface 10A side of the first light-transmissive substrate 10 or the first principal surface side of the second light-transmissive substrate 20, similarly to the first embodiment. This configuration allows a background on the first principal surface 20A side of the second light-transmissive substrate 20 to be visually recognized from the first principal surface 10A of the first light-transmissive substrate 10, or a background on the first principal surface 10A side of the first light-transmissive substrate 10 to be visually recognized from the first principal surface 20A of the second light-transmissive substrate 20.

In the display apparatus 1 according to the fourth modification of the first embodiment, one of the light-emitting devices 31 may be arranged to face a first side surface 10C of the first light-transmissive substrate 10 and the first side surface 20C of the second light-transmissive substrate 20, and the other of the light-emitting devices 31 may be arranged to face a fourth side surface 10F of the first light-transmissive substrate 10 and the fourth side surface 20F of the second light-transmissive substrate 20, similarly to the third modification of the first embodiment. The reflector 60 may be arranged on a second side surface 10D on the opposite side of the first side surface 10C on the light-emitting device 31 side, and reflect light at the second side surface 10D. The cross-section taken along line XIII-XIII' in FIG. 22 may correspond to the cross-section illustrated in FIG. 21, and the reflector 60 may be arranged on the second side surface 10D on the opposite side of the first side surface 10C on the light-emitting device 31 side, and reflect the light at the second side surface 10D.

Second Embodiment

Figure 24:
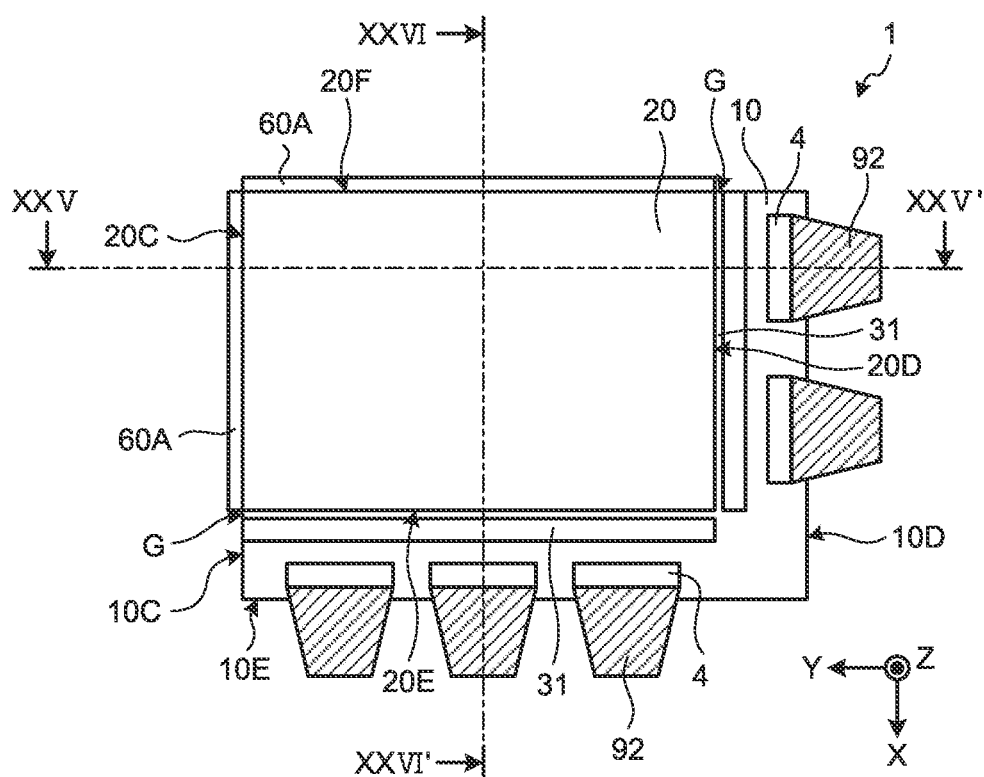
FIG. 24 is a plan view illustrating a plane of a display apparatus according to a second embodiment.
Figure 25:
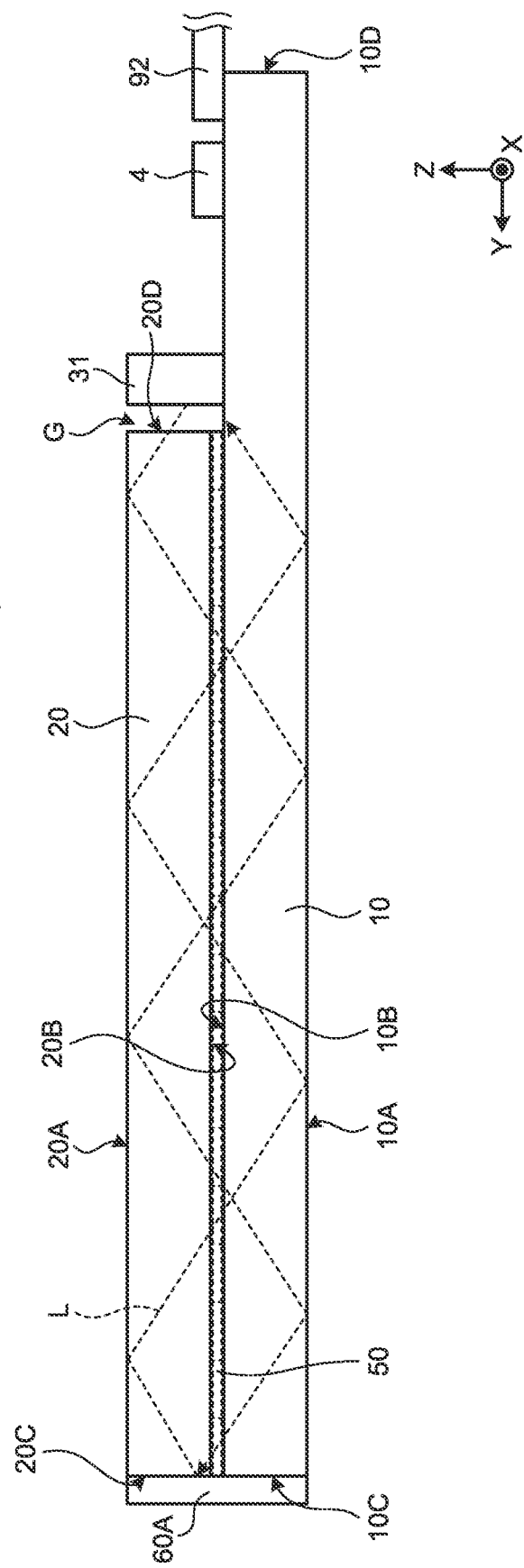
FIG. 25 is a cross-sectional view illustrating a cross-section taken along line XXV-XXV' in FIG. 24.
Figure 26:
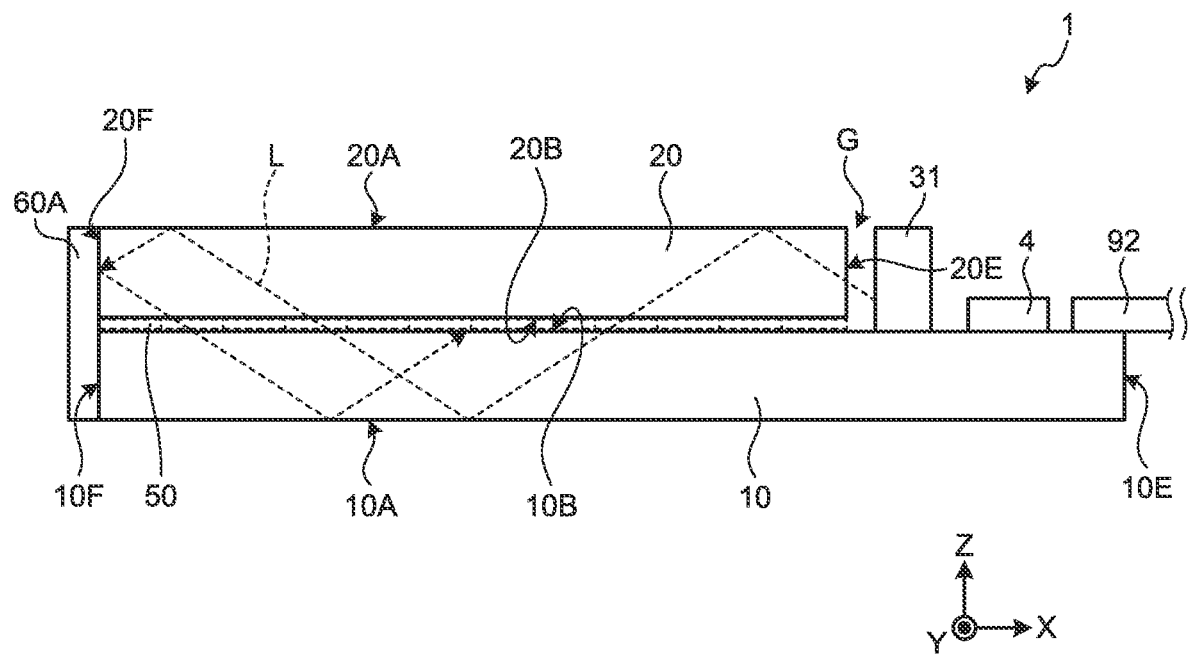
FIG. 26 is a cross-sectional view illustrating a cross-section taken along line XXVI-XXVI' in FIG. 24.
Figure 27:
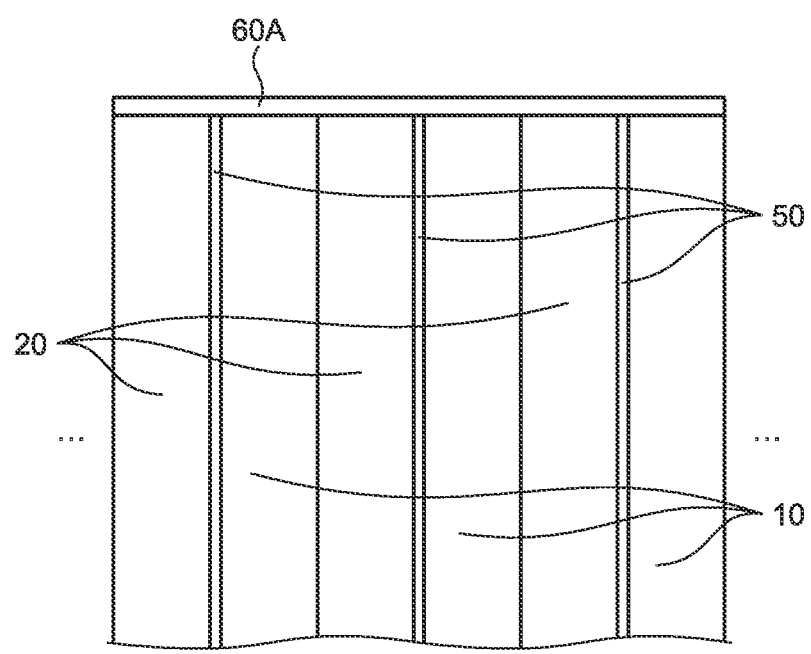
FIG. 27 is an explanatory view for describing a method of manufacturing a reflector of the display apparatus according to the second embodiment.

FIG. 24 is a plan view illustrating a plane of a display apparatus according to a second embodiment. FIG. 25 is a cross-sectional view illustrating a cross-section taken along line XXV-XXV' in FIG. 24. FIG. 26 is a cross-sectional view illustrating a cross-section taken along line XXVI-XXVI' in FIG. 24. FIG. 27 is an explanatory view for describing a method of manufacturing a reflector of the display apparatus according to the second embodiment. The same configuration elements as those described in the above first embodiment and modifications thereof are denoted with the same reference signs, and overlapping description is omitted.

A reflector 60A of the second embodiment is arranged at the position of the light-emitting device 31 according to the fourth modification of the first embodiment, and a light-emitting device 31 of the second embodiment is arranged at the position of the reflector 60 according to the fourth modification of the first embodiment.

As illustrated in FIGS. 24 and 25, the light-emitting device 31 is provided to face a second side surface 20D of a second light-transmissive substrate 20. As illustrated in FIG. 25, the light-emitting device 31 irradiates the second side surface 20D of the second light-transmissive substrate 20 with light L. The second side surface 20D, which faces the light-emitting device 31, of the second light-transmissive substrate 20 serves as a light incident surface. A gap G is provided between the light-emitting device 31 and the light incident surface. The gap G serves as an air layer.

As illustrated in FIG. 25, the light L radiated from the light-emitting device 31 propagates in a direction away from the second side surface 20D while being reflected at a first principal surface 10A of a first light-transmissive substrate 10 and a first principal surface 20A of the second light-transmissive substrate 20.

As illustrated in FIGS. 24 and 25, the reflector 60A that reflects the light is provided on a first side surface 10C of the first light-transmissive substrate 10 and on a first side surface 20C of the second light-transmissive substrate 20. The first side surface 10C is perpendicular to the first principal surface 10A of the first light-transmissive substrate 10. The first side surface 20C is perpendicular to the first principal surface 20A of the second light-transmissive substrate 20. The light is reflected at the first side surface 10C or the first side surface 20C by the reflector 60A. The light reflected at the first side surface 10C or the first side surface 20C propagates in a direction away from the first side surface 10C or the first side surface 20C while being reflected at the first principal surface 10A of the first light-transmissive substrate 10 and the first principal surface 20A of the second light-transmissive substrate 20.

As illustrated in FIGS. 24 and 26, a light-emitting device 31 is provided to face a third side surface 20E of the second light-transmissive substrate 20. As illustrated in FIG. 26, the light-emitting device 31 irradiates the third side surface 20E of the second light-transmissive substrate 20 with the light L. The third side surface 20E, which faces the light-emitting device 31, of the second light-transmissive substrate 20 serves as a light incident surface. A gap G is provided between the light-emitting device 31 and the light incident surface. The gap G serves as an air layer.

As illustrated in FIG. 26, the light L radiated from the light-emitting device 31 propagates in a direction away from the third side surface 20E while being reflected at the first principal surface 10A of the first light-transmissive substrate 10 and the first principal surface 20A of the second light-transmissive substrate 20.

As illustrated in FIGS. 24 and 26, a reflector 60A that reflects the light is provided on a fourth side surface 10F of the first light-transmissive substrate 10 and on a fourth side surface 20F of the second light-transmissive substrate 20. The fourth side surface 20F is perpendicular to the first principal surface 20A of the second light-transmissive substrate 20. The fourth side surface 10F is perpendicular to the first principal surface 10A of the first light-transmissive substrate 10. The light is reflected at the fourth side surface 10F or the fourth side surface 20F by the reflector 60. The light reflected at the fourth side surface 10F or the fourth side surface 20F propagates in a direction away from the fourth side surface 10F or the fourth side surface 20F while being reflected at the first principal surface 10A of the first light-transmissive substrate 10 and the first principal surface 20A of the second light-transmissive substrate 20.

The reflector 60A of the second embodiment is a reflection film formed by sputtering of a metal such as aluminum or silver. Any material can be used for the reflector 60A as long as the material has high reflectance. As illustrated in FIG. 27, the first light-transmissive substrates 10 and the second light-transmissive substrates 20 are arranged in a state of being bonded together, and the reflectors 60A are collectively formed on a plurality of display panels. The reflector 60A of the display apparatus according to the second embodiment can have the same structure as any of the reflectors 60 and 65 described in the first embodiment and modifications thereof.

The display apparatus 1 according to the second embodiment includes the first light-transmissive substrate 10, the second light-transmissive substrate 20, a liquid crystal layer 50, the light-emitting devices 31, and the reflectors 60A. The two light-emitting devices 31 are respectively arranged to face the second side surface 20D and the third side surface 20E of the second light-transmissive substrate 20. One of the reflectors 60A is arranged on the first side surface 20C and the first side surface 10C on the opposite side of the second side surface 20D on the light-emitting device 31 side, and reflects light at first side surface 20C or the first side surface 10C. Similarly, the other of the reflectors 60A is arranged on the fourth side surface 20F and the fourth side surface 10F on the opposite side of the third side surface 20E on the light-emitting device 31 side, and reflects light at the fourth side surface 20F or the fourth side surface 10F. According to this configuration, the two reflectors 60 reflect light at the first side surface 20C, the first side surface 20C, the fourth side surface 20F, or the fourth side surface 10F, which reduces a difference between amounts of the light emitted from the two light-emitting devices 31 and propagating through the display panel 2, and increases the amounts of the light emitted from the two light-emitting devices 31 and propagating through the display panel 2. Further, the configuration improves uniformity of the light propagating through the display panel 2. The respective reflectors 60A may be individually provided on the first side surface 20C and the first side surface 20C, and the respective reflectors 60A may be individually provided on the fourth side surface 20F and the fourth side surface 10F.

In the second embodiment, one of the reflectors 60A may be arranged on a second side surface 10D on the opposite side of the first side surface 10C on the light-emitting device 31 side, and the other of the reflectors 60A may reflect the light at the second side surface 10D.

The display apparatus 1 according to the second embodiment has no backlight device and no reflection plate on the first principal surface 10A side of the first light-transmissive substrate 10 or the first principal surface 20A side of the second light-transmissive substrate 20, similarly to the first embodiment. This configuration allows a background on the first principal surface 20A side of the second light-transmissive substrate 20 to be visually recognized from the first principal surface 10A of the first light-transmissive substrate 10, or a background on the first principal surface 10A side of the first light-transmissive substrate 10 to be visually recognized from the first principal surface 20A of the second light-transmissive substrate 20.

By applying the second embodiment to the first embodiment, the reflector 60A of the second embodiment may be arranged at the position of the light-emitting device 31 according to the first embodiment, and the light-emitting device 31 of the second embodiment may be arranged at the position of the reflector 60 according to the first embodiment.

Preferred embodiments of the present disclosure have been described. However, the present disclosure is not limited by these embodiments. The content disclosed in the embodiments is merely an example, and various modifications can be made without departing from the gist of the present disclosure. Appropriate modifications made without departing from the gist of the present disclosure obviously belong to the technical scope of the present disclosure. All the technologies that can be appropriately designed, modified, and implemented by a person skilled in the art on the basis of the above-described disclosure belong to the technical scope of the present disclosure as long as the technologies include the gist of the present disclosure.

For example, the display panel 2 may be a passive matrix panel without a switching element. The passive matrix panel includes, in plan view, a first electrode extending in an X direction, a second electrode extending in a Y direction, and wiring electrically coupled with the first electrode or the second electrode. The first electrode, the second electrode, and the wiring are formed of, for example, ITO. For example, the first light-transmissive substrate 10 including the above-described first electrode, and the second light-transmissive substrate 20 including the second electrode are arranged to face each other with the liquid crystal layer 50 interposed therebetween.

The example in which the first orientation film 55 and the second orientation film 56 are the vertical orientation films has been described. However, the first orientation film 55 and the second orientation film 56 may be horizontal orientation films. The first orientation film 55 and the second orientation film 56 only need to have a function to orient the monomers in a predetermined direction in polymerizing the monomers. This allows the monomers to become polymers oriented in the predetermined direction. When the first orientation film 55 and the second orientation film 56 are the horizontal orientation films, the direction of the optical axis Ax1 of the bulk 51 and the direction of the optical axis Ax2 of the fine particle 52 are the same, and are perpendicular to the Z direction, in a state in which no voltage is applied between the pixel electrode 16 and the common electrode 22. The direction perpendicular to the Z direction corresponds to the X direction or the Y direction along a side of the first light-transmissive substrate 10 in plan view.

What is claimed is:

1. A display apparatus comprising:
    a first substrate having a first side surface, a second side surface opposite to the first side surface, a third side surface, and a fourth side surface opposite to the third side surface;
    a second substrate arranged to overlap the first substrate and having a first side surface, a second side surface opposite to the first side surface, a third side surface, and a fourth side surface opposite to the third side surface;
    a liquid crystal layer including polymer dispersed liquid crystals placed between the first substrate and the second substrate;
    a plurality of light-emitting devices arranged to face the first side surface of the second substrate at a light source side;
    an air gap disposed between the light-emitting devices and the first side surface of the second substrate at the light source side;
    a first reflector arranged to cover both the second side surface of the first substrate and the second side surface of the second substrate;
    a plurality of scanning lines;
    a plurality of signal lines crossing the scanning lines;
    a thin film transistor disposed at an intersection of one of the scanning lines and one of the signal lines; and
    a plurality of pixels arranged in a matrix, the pixels each having a pixel electrode that has a shape of a square, wherein
    an adhesive layer fixes the first reflector to the second side surface of the first substrate and the second side surface of the second substrate,
    the first substrate is larger than the second substrate in a plan view,
    the light-emitting devices are located fully within the first substrate in the plan view,
    the thin film transistor includes a gate electrode and a semiconductor layer,
    the gate electrode has an area greater than an area of the semiconductor layer in such manner that the semiconductor layer does not protrude from the gate electrode in the plan view, and
    the light emitting devices, each including a luminous body of a first color, a luminous body of a second color, and a luminous body of a third color, are driven by a field sequential method.

2. The display apparatus according to claim 1, further comprising a second reflector arranged to cover both the third side surface of the first substrate and the third side surface of the second substrate, wherein
    the first reflector and the second reflector are formed of aluminum or silver in a film manner.

3. The display apparatus according to claim 2, wherein
    a refractive index of the adhesive layer is equal to or less than that of the first substrate or the second substrate.

4. The display apparatus according to claim 1, further comprising a second reflector arranged to cover both the third side surface of the first substrate and the third side surface of the second substrate, wherein
    the first reflector and the second reflector are formed of metal particles of aluminum or silver to have a paste form.

5. The display apparatus according to claim 1, wherein
the light-emitting devices are arranged on a portion of the first substrate which is exposed from the second substrate.

6. The display apparatus according to claim 1, wherein
in a first predetermined time, the luminous body of the first color emits light, the pixels selected within one vertical scanning period transmit and display the light, and in an entire display area, when a gradation signal according to an output gradation value of each of the pixels selected within the one vertical scanning period is supplied to each of the signal lines, only the first color is lighted, in a second predetermined time, the luminous body of the second color emits light, the pixels selected within one vertical scanning period transmit and display the light, and in the entire display area, when a gradation signal according to an output gradation value of each of the pixels selected within the one vertical scanning period is supplied to each of the signal lines, only the second color is lighted, and in a third predetermined time, the luminous body of the third color emits light, the pixels selected within one vertical scanning period transmit and display the light, and in the entire display area, when a gradation signal according to an output gradation value of each of the pixels selected within the one vertical scanning period is supplied to each of the signal lines, only the third color is lighted.

* * * * *